US00RE48425E

(19) United States
(12) Reissued Patent
Kiukkonen et al.

(10) Patent Number: US RE48,425 E
(45) Date of Reissued Patent: Feb. 2, 2021

(54) METHOD, APPARATUS, AND COMPUTER PROGRAM PRODUCT FOR POWER SAVE CONTROL FOR TETHERING CONNECTIONS

(71) Applicant: Nokia Technologies Oy, Espoo (FI)

(72) Inventors: Niko Kiukkonen, Veikkola (FI); Janne Marin, Espoo (FI); Jukka Reunamaki, Tampere (FI)

(73) Assignee: Nokia Technologies Oy, Espoo (FI)

(21) Appl. No.: 15/245,495

(22) Filed: Aug. 24, 2016

Related U.S. Patent Documents

Reissue of:
(64) Patent No.: 9,066,197
Issued: Jun. 23, 2015
Appl. No.: 13/746,717
Filed: Jan. 22, 2013

(51) Int. Cl.
*H04B 5/00* (2006.01)
*H04W 4/00* (2018.01)
(Continued)

(52) U.S. Cl.
CPC ..... *H04W 4/80* (2018.02); *H04W 12/003* (2019.01); *H04W 52/028* (2013.01);
(Continued)

(58) Field of Classification Search
CPC . H04W 4/80; H04W 12/003; H04W 52/0229; H04W 52/0251; H04W 52/028; Y02D 30/70
See application file for complete search history.

(56) References Cited

U.S. PATENT DOCUMENTS

2005/0186906 A1* 8/2005 Hussmann ..... 455/41.2
2006/0084439 A1 4/2006 Joshi et al.
(Continued)

FOREIGN PATENT DOCUMENTS

WO WO2011019976 2/2011

OTHER PUBLICATIONS

Extended European Search Report for Application No. 13192399.7-1855 dated Apr. 28, 2014.
(Continued)

*Primary Examiner* — Robert L Nasser
(74) *Attorney, Agent, or Firm* — Locke Lord LLP

(57) ABSTRACT

Example method, apparatus, and computer program product embodiments are disclosed for configuring a mobile wireless hotspot in a wireless network. Example embodiments of the invention include a method comprising: establishing, by a mobile hotspot device, a control channel with a wireless device, using an out-of-band communications connection in an out-of-band communications medium; and exchanging, by the wireless device over the control channel, with the mobile hotspot device, by at least one of transmitting or receiving in-band communications connectivity configuration information to enable power saving features and optimize activity times in an in-band communications tethering connection with the mobile hotspot device in an in-band communications medium, for relaying by the mobile hotspot device, communications between the wireless device and one or more entities in at least one of a wide area communications network and a wireless local area network provided by the mobile hotspot device.

22 Claims, 13 Drawing Sheets

(51) Int. Cl.
*H04W 52/02* (2009.01)
*H04W 4/80* (2018.01)
*H04W 12/00* (2009.01)

(52) U.S. Cl.
CPC ... *H04W 52/0229* (2013.01); *H04W 52/0251* (2013.01); *Y02D 30/70* (2020.08)

(56) References Cited

U.S. PATENT DOCUMENTS

2008/0076411 A1 3/2008 Khetawat et al.
2009/0129341 A1 5/2009 Balasubramanian et al.
2010/0267368 A1 10/2010 Masputra
2011/0028085 A1* 2/2011 Waung et al. ..... 455/7
2011/0225640 A1 9/2011 Ganapathy et al.
2011/0263242 A1 10/2011 Tinnakornsrisuphap et al.
2011/0268027 A1 11/2011 Nogawa
2012/0026992 A1 2/2012 Navda et al.
2012/0033611 A1* 2/2012 Wu ..... 370/328
2012/0052793 A1 3/2012 Brisebois et al.
2012/0110640 A1 5/2012 Donelson et al.
2012/0115471 A1 5/2012 Awoniyi et al.
2012/0182966 A1 7/2012 Das et al.
2012/0264474 A1* 10/2012 Joh et al. ..... 455/517
2013/0331028 A1* 12/2013 Kuehnel et al. ..... 455/41.1
2014/0073289 A1 3/2014 Velasco
2014/0126391 A1* 5/2014 Liu ..... H04W 52/0206 370/252
2017/0187425 A1* 6/2017 Kuscher ..... H04B 5/0031

OTHER PUBLICATIONS

IEEE 100 The Authoritative Dictionary of IEEE Standards Terms, Seventh Edition, dated 2000, p. 542 and p. 778.*
"Bluetooth Pairing" by BlueTomorrow.com, archived on Mar. 12, 2009.*

* cited by examiner

100

METHOD, APPARATUS, AND COMPUTER PROGRAM PRODUCT FOR POWER SAVE CONTROL FOR TETHERING CONNECTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD

The field of the invention relates to wireless communication, and more particularly to configuring a mobile wireless hotspot in a wireless network.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. BLUETOOTH protocol is an example of a short-range wireless technology quickly gaining acceptance in the marketplace. In addition to BLUETOOTH protocol other short-range communication technologies include BLUETOOTH Low Energy, IEEE 802.11 wireless local area network (WLAN), Wireless USB, ZigBee (IEEE 802.15.4, IEEE 802.15.4a), and ultra high frequency radio frequency identification (UHF RFID) technologies. All of these wireless communication technologies have features and advantages that make them appropriate for various applications.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection that may be used to exchange specific information for another communications protocol, which may then be used to create an actual connection in the other communications protocol, such as BLUETOOTH protocol or wireless local area network (WLAN).

SUMMARY

Example method, apparatus, and computer program product embodiments are disclosed for configuring a mobile wireless hotspot in a wireless network.

Example embodiments of the invention include a method comprising:

establishing, by a mobile hotspot device, a control channel with a wireless device, using an out-of-band communications connection in an out-of-band communications medium; and exchanging, by the mobile hotspot device over the control channel, with the wireless device, by at least one of transmitting or receiving in-band communications connectivity configuration information to enable power saving features and optimize activity times in an in-band communications tethering connection with the wireless device in an in-band communications medium, for relaying by the mobile hotspot device, communications between the wireless device and one or more entities in at least one of a wide area communications network and a wireless local area network provided by the mobile hotspot device.

Example embodiments of the invention include a method comprising:

receiving, by the mobile hotspot device, over the control channel, a request from the wireless device for an in-band communications tethering connection for relaying by the mobile hotspot device, communications between the wireless device and a wide area communications network;

performing, by the mobile hotspot device, said exchanging over the control channel, with the wireless device, of the in-band communications connectivity configuration information, in response to receiving the request; and transitioning, by the mobile hotspot device, from an in-band communications idle state to an in-band communications active state using the power saving features and optimized activity times for the in-band communications tethering connection, in response to receiving the request.

Example embodiments of the invention include a method comprising:

exchanging, by the mobile hotspot device, over the control channel, with the wireless device, adjustments in the in-band communications connectivity configuration information to modify at least one of the power saving features and optimized activity times in the in-band communications tethering connection with the wireless device.

Example embodiments of the invention include a method comprising:

transitioning, by the mobile hotspot device, from the in-band communications active state to the in-band communications idle state of the in-band communications tethering connection, when no requests are received from any wireless device, for an in-band communications tethering connection for relaying by the mobile hotspot device, communications between the any wireless device and a wide area communications network.

Example embodiments of the invention include a method comprising:

wherein the out-of-band communications connection is one of a BLUETOOTH protocol, a BLUETOOTH Low Energy, or a Near Field Communications connection and the in-band communications tethering connection is a WLAN connection or another local connectivity channel having low power.

Example embodiments of the invention include a method comprising:

reading, by a connectivity management system in the mobile hotspot device, device capabilities of the mobile hotspot device;

generating, by the connectivity management system in the mobile hotspot device, the in-band communications connectivity configuration information to enable the wireless device to connect to the mobile hotspot device as a tethered wireless device, the in-band communications connectivity configuration information including specification of the in-band tethering connection having a network name and passkey; and receiving, by the connectivity management system in the mobile hotspot device, via the in-band communications medium from the wireless device, an in-band tethering connection request based on the in-band communications connectivity configuration information.

Example embodiments of the invention include a method comprising:

exchanging, by the mobile hotspot device, via at least one of the out-of-band communications medium with the wireless device or via a wide area network connected to a server, at least one of an out-of-band communications MAC address of the hotspot device, an out-of-band communications MAC address of the wireless device, out-of-band pairing information, and shared secret information, for said establishing of the control channel with the wireless device.

Example embodiments of the invention include an apparatus comprising:

at least one processor;

at least one memory including computer program code;

the at least one memory and the computer program code configured to, with the at least one processor, cause the apparatus at least to:

establish a control channel with a wireless device, using an out-of-band communications connection in an out-of-band communications medium; and exchange over the control channel, with the wireless device, by at least one of transmitting or receiving in-band communications connectivity configuration information to enable power saving features and optimize activity times in an in-band communications tethering connection with the wireless device in an in-band communications medium, for relaying by the apparatus, communications between the wireless device and one or more entities in at least one of a wide area communications network and a wireless local area network provided by the apparatus.

Example embodiments of the invention include an apparatus comprising:

the at least one memory and the computer program code configured to, with the at least one processor, cause the apparatus at least to:

receive over the control channel, a request from the wireless device for an in-band communications tethering connection for relaying by the apparatus, communications between the wireless device and a wide area communications network;

perform said exchanging over the control channel, with the wireless device, of the in-band communications connectivity configuration information, in response to receiving the request; and transition from an in-band communications idle state to an in-band communications active state using the power saving features and optimized activity times for the in-band communications tethering connection, in response to receiving the request.

Example embodiments of the invention include an apparatus comprising:

the at least one memory and the computer program code configured to, with the at least one processor, cause the apparatus at least to:

exchange over the control channel, with the wireless device, adjustments in the in-band communications connectivity configuration information to modify at least one of the power saving features and optimized activity times in the in-band communications tethering connection with the wireless device.

Example embodiments of the invention include an apparatus comprising:

the at least one memory and the computer program code configured to, with the at least one processor, cause the apparatus at least to:

transition from the in-band communications active state to the in-band communications idle state of the in-band communications tethering connection, when no requests are received from any wireless device, for an in-band communications tethering connection for relaying by the apparatus, communications between the any wireless device and a wide area communications network.

Example embodiments of the invention include an apparatus comprising:

wherein the out-of-band communications connection is one of a BLUETOOTH protocol, a BLUETOOTH Low Energy, or a Near Field Communications connection and the in-band communications tethering connection is a WLAN connection or another local connectivity channel having low power.

Example embodiments of the invention include an apparatus comprising:

the at least one memory and the computer program code configured to, with the at least one processor, cause the apparatus at least to:

read, by a connectivity management system in the apparatus, device capabilities of the apparatus;

generate, by the connectivity management system in the apparatus, the in-band communications connectivity configuration information to enable the wireless device to connect to the apparatus as a tethered wireless device, the in-band communications connectivity configuration information including specification of the in-band tethering connection having a network name and passkey; and receive, by the connectivity management system in the apparatus, via the in-band communications medium from the wireless device, an in-band tethering connection request based on the in-band communications connectivity configuration information.

Example embodiments of the invention include an apparatus comprising:

the at least one memory and the computer program code configured to, with the at least one processor, cause the apparatus at least to:

exchange via at least one of the out-of-band communications medium with the wireless device or via a wide area network connected to a server, at least one of an out-of-band communications MAC address of the hotspot device, an out-of-band communications MAC address of the wireless device, out-of-band pairing information, and shared secret information, for said establishing of the control channel with the wireless device.

Example embodiments of the invention include a computer program product comprising computer executable program code recorded on a computer readable non-transitory storage medium, the computer executable program code comprising:

code for establishing, by a mobile hotspot device, a control channel with a wireless device, using an out-of-band communications connection in an out-of-band communications medium; and code for exchanging, by the mobile hotspot device over the control channel, with the wireless device, by at least one of transmitting or receiving in-band communications connectivity configuration information to enable power saving features and optimize activity times in an in-band communications tethering connection with the wireless device in an in-band communications medium, for relaying by the mobile hotspot device, communications between the wireless device and one or more entities in at least one of a wide area communications network and a wireless local area network provided by the mobile hotspot device.

Example embodiments of the invention include a method comprising:

establishing, by a wireless device, a control channel with a mobile hotspot device, using an out-of-band communications connection in an out-of-band communications medium; and exchanging, by the wireless device over the control channel, with the mobile hotspot device, by at least one of transmitting or receiving in-band communications connectivity configuration information to enable power saving features and optimize activity times in an in-band communications tethering connection with the mobile hotspot device in an in-band communications medium, for relaying by the mobile hotspot device, communications between the wireless device and one or more entities in at least one of a wide area communications network and a wireless local area network provided by the mobile hotspot device.

Example embodiments of the invention include a method comprising:

transmitting, by the wireless device, over the control channel, a request to the mobile hotspot device for an in-band communications tethering connection for relaying by the mobile hotspot device, communications between the wireless device and a wide area communications network;

performing, by the wireless device, said exchanging over the control channel, with the mobile hotspot device, of the in-band communications connectivity configuration information; and establishing, by the wireless device, the in-band communications tethering connection with the mobile hotspot device, using the power saving features and optimized activity times for the in-band communications tethering connection.

Example embodiments of the invention include an apparatus comprising:

at least one processor;

at least one memory including computer program code;

the at least one memory and the computer program code configured to, with the at least one processor, cause the apparatus at least to:

establish a control channel with a mobile hotspot device, using an out-of-band communications connection in an out-of-band communications medium; and exchange over the control channel, with the mobile hotspot device, by at least one of transmitting or receiving in-band communications connectivity configuration information to enable power saving features and optimize activity times in an in-band communications tethering connection with the mobile hotspot device in an in-band communications medium, for relaying by the mobile hotspot device, communications between the apparatus and one or more entities in at least one of a wide area communications network and a wireless local area network provided by the mobile hotspot device.

Example embodiments of the invention include an apparatus comprising:

the at least one memory and the computer program code configured to, with the at least one processor, cause the apparatus at least to:

transmit over the control channel, a request to the mobile hotspot device for an in-band communications tethering connection for relaying by the mobile hotspot device, communications between the apparatus and a wide area communications network;

perform said exchanging over the control channel, with the mobile hotspot device, of the in-band communications connectivity configuration information; and establish the in-band communications tethering connection with the mobile hotspot device, using the power saving features and optimized activity times for the in-band communications tethering connection.

Example embodiments of the invention include a computer program product comprising computer executable program code recorded on a computer readable non-transitory storage medium, the computer executable program code comprising:

code for establishing, by a wireless device, a control channel with a mobile hotspot device, using an out-of-band communications connection in an out-of-band communications medium; and code for exchanging, by the wireless device over the control channel, with the mobile hotspot device, by at least one of transmitting or receiving in-band communications connectivity configuration information to enable power saving features and optimize activity times in an in-band communications tethering connection with the mobile hotspot device in an in-band communications medium, for relaying by the mobile hotspot device, communications between the wireless device and one or more entities in at least one of a wide area communications network and a wireless local area network provided by the mobile hotspot device.

The resulting embodiments configure a mobile wireless hotspot in a wireless network.

DISCUSSION OF EXAMPLE EMBODIMENTS OF THE INVENTION

Figure 1:
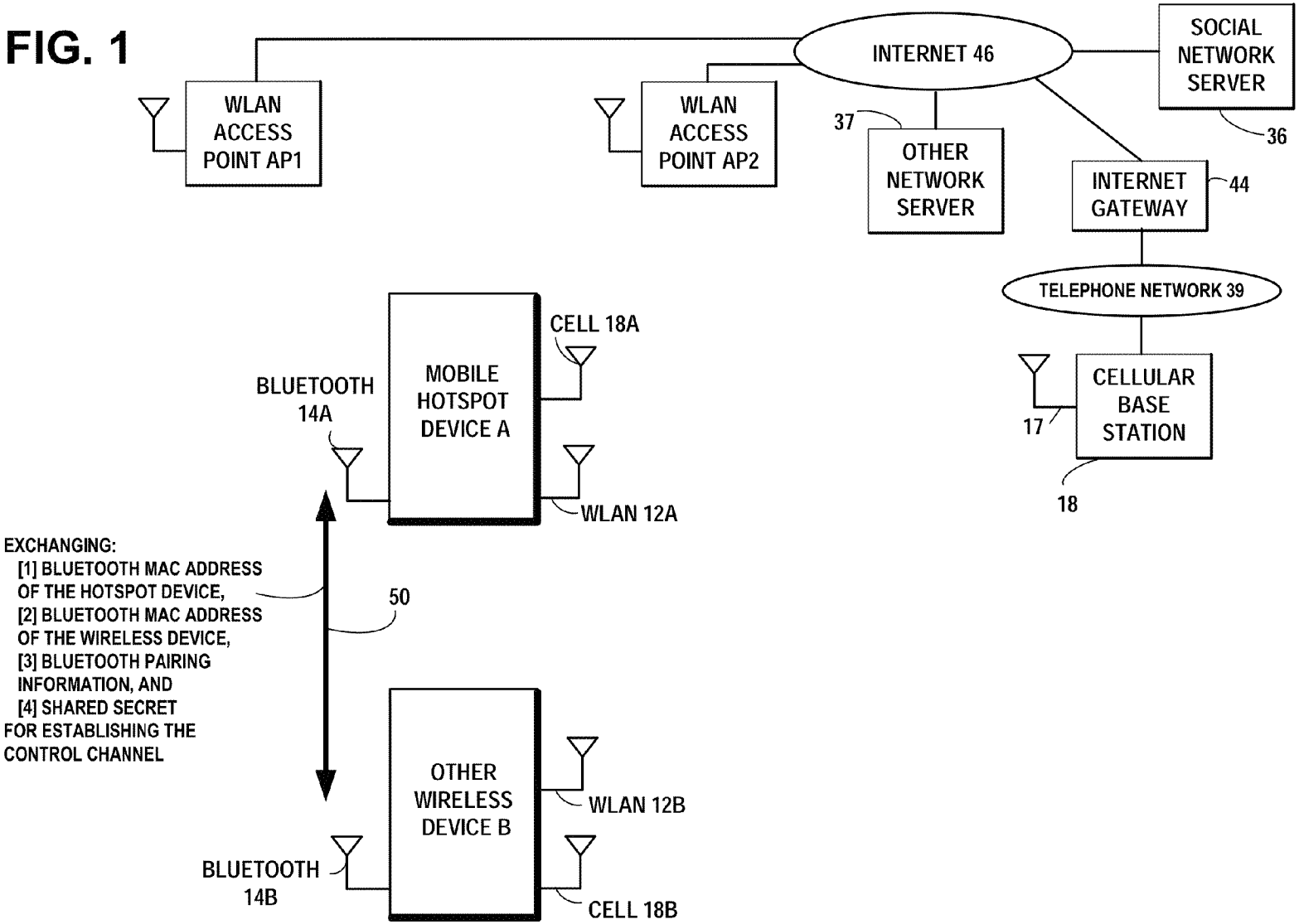
FIG. 1 is an example network diagram of a mobile wireless hotspot device A and the other wireless device B, exchanging the BLUETOOTH protocol MAC address of the hotspot device, the BLUETOOTH protocol MAC address of the wireless device, BLUETOOTH protocol pairing information, and shared secret for establishing the control channel, in accordance with example embodiments of the invention.

This section is organized into the following topics:

A. Wireless Short-Range Communication Networks

B. Connection Formation Between BLUETOOTH protocol Devices

C. WLAN Communication Technology

1, IEEE 802.11 WLAN

2. Wi-Fi Protected Setup/Wi-Fi Simple Configuration (WSC)

3. Authentication in Wi-Fi Protected Setup/Wi-Fi Simple Configuration

4. Wi-Fi Direct—Software Access Points

D. Near-Field Communication (NFC) Technology

E. Power Save Control For Tethering Connections

A. Wireless Short-Range Communication Networks

Short-range communication technologies provide communication solutions appropriate for many data applications, without the cost, traffic and legislative concerns of longer-range communication technologies. Short-range communication technologies include BLUETOOTH protocol basic rate/enhanced data rate (BR/EDR), BLUETOOTH Low Energy (LE), IEEE 802.11 wireless local area network (WLAN), Wireless Universal Serial Bus (WUSB), ZigBee (IEEE 802.15.4, IEEE 802.15.4a), and near field communication technologies, such as radio frequency identification (RFID) and near field communication (NFC) technology that enable contactless identification and interconnection of wireless devices.

B. Connection Formation Between BLUETOOTH Protocol Devices

A procedure for forming connections between BLUETOOTH protocol devices is described in the BLUETOOTH protocol Specification, Version 4, Jun. 30, 2010. The BLUETOOTH protocol Baseband is the part of the BLUETOOTH protocol system that implements the Media Access Control (MAC) and physical layer procedures to support the connection formation, exchange of data information streams, and ad hoc networking between BLUETOOTH protocol devices. Connection formation may include inquiry, inquiry scanning, inquiry response, in addition to paging, page scanning, and page response procedures.

1. Inquiry

Inquiry is a procedure where a BLUETOOTH protocol device transmits inquiry messages and listens for responses in order to discover the other BLUETOOTH protocol devices that are within the coverage area and set discoverable. BLUETOOTH protocol devices use the inquiry procedure to discover nearby devices, or to be discovered by devices in their locality. A BLUETOOTH protocol device that tries to find other nearby devices is known as an inquiring device and actively sends inquiry requests. BLUETOOTH protocol devices that are available to be found are known as discoverable devices, listen or scan for these inquiry requests, and send responses. The inquiry procedure uses dedicated physical channels for the inquiry requests and responses. The inquiry procedure does not make use of any of the architectural layers above the physical channel, although a transient physical link may be considered to be present during the exchange of inquiry and inquiry response information.

BLUETOOTH protocol devices communicate with one another over a total bandwidth of 80 MHz divided into 79 physical channels of 1 MHz each. An inquiring device wanting to discover other devices repetitively probes a first set of 16 frequencies, probing two frequencies every 625 microseconds. It repeats this at least 256 times. Then, it repetitively probes a second set of 16 frequencies. The inquiring device will repeat entire cycle at least two times. Of the 79 radio carriers, 32 are considered wake-up carriers and the inquiring device Broadcasts inquiry packets on these 32 carrier frequencies.

During the inquiry procedure, the master transmits inquiry messages with the general or dedicated inquiry access code. The timing for inquiry is the same as for paging. The identity or ID packet consists of the inquiry access code (IAC). It has a fixed length of 68 bits. The receiver uses a bit correlator to match the received packet to the known bit sequence of the ID packet. In order to discover other devices a device may enter inquiry substate. In this substate, it may repeatedly transmit the inquiry message (ID packet) at different hop frequencies. The inquiry hop sequence is derived from the Lower Address Part (LAP) of the General Inquiry Access Code (GIAC). Thus, even when dedicated inquiry access codes (DIACs) are used, the applied hopping sequence is generated from the GIAC LAP. A device that allows itself to be discovered, should regularly enter the inquiry scan substate to respond to inquiry messages. During the inquiry substate, the discovering device may collect the BLUETOOTH protocol device Addresses of all devices that respond to the inquiry message. In addition, the discovering device also collects extended information (e.g. local name and supported services) from devices that respond with an extended inquiry response packet. It may then, if desired, make a connection to any one of the discovered devices by means of the page procedure described below. The inquiry message broadcast by the source does not contain any information about the source. However, it may indicate which class of devices should respond. There is one general inquiry access code (GIAC) to inquire for any device, and a number of dedicated inquiry access codes (DIAC) that only inquire for a certain type of device. The inquiry access codes are derived from reserved BLUETOOTH protocol device addresses. There is only one DIAC defined in the BLUETOOTH protocol Specification, and it is called the Limited Inquiry Access Code (LIAC). The LIAC is only intended to be used for limited time periods in scenarios where both devices have been explicitly caused to enter this state, usually by user action.

Inquiry scan is a procedure where a BLUETOOTH protocol device listens for inquiry messages received on its inquiry scan physical channel. A device using one of its inquiry scan channels remains passive for duration of the inquiry scan window on that channel until it receives an inquiry message on this channel from another BLUETOOTH protocol device. This is identified by the appropriate inquiry access code. If the inquiry scanning device receives an inquiry message during scan window it will then follow the inquiry response procedure to return a response to the inquiring device. The inquiry scan substate is very similar to the page scan substate. However, instead of scanning for the device's device Access code, the receiver should scan for the inquiry access code long enough to completely scan for 16 inquiry packets. The inquiry procedure uses 32 dedicated inquiry hop frequencies according to the inquiry hopping sequence. These frequencies are determined by the general inquiry address. The phase is determined by the native clock of the device carrying out the inquiry scan. Instead of, or in addition to, the general inquiry access code, the device may scan for one or more dedicated inquiry access codes. However, the scanning may follow the inquiry scan hopping sequence determined by the general inquiry address. The inquiry scan interval may be less than or equal to 2.56 s.

2. Inquiry Response

An inquiry response packet (FHS) is transmitted from the slave to the master after the slave has received an inquiry message. This packet contains information necessary for the inquiring master to page the slave and follows 625 microseconds after the receipt of the inquiry message. The inquiry response packet is received by the master at the hop frequency when the inquiry message received by the slave was first in the master-to-slave slot. The slave response substate for inquiries differs completely from the slave response substate applied for pages. When the inquiry message is received in the inquiry scan substate, the recipient shall return an inquiry response (FHS) packet containing the recipient's device Address (BD_ADDR) and other parameters. If the recipient has non-zero extended inquiry response data to send, it may return an extended inquiry response packet after the FHS packet. On the first inquiry message received in the inquiry scan sub state the slave may enter the inquiry response substate. If the slave has non-zero extended inquiry response data to send it may return an FHS packet, with the extended inquiry response bit set to one, to the master 625 microseconds after the inquiry message was received. It may then return an extended inquiry response packet 1250 microseconds after the start of the FHS packet. If the slave's extended inquiry response data is all zeroes the slave may only return an FHS packet with the extended inquiry response bit set to zero.

A contention problem could arise when several devices are in close proximity to the inquiring device or master and all respond to an inquiry message at the same time. However, because every device has a free running clock it is highly unlikely that they all use the same phase of the inquiry hopping sequence. In order to avoid repeated collisions between devices that wake up in the same inquiry hop channel simultaneously, a device will back-off for a random period of time. Thus, if the device receives an inquiry message and returns an FHS packet, it will generate a random number, RAND, between 0 and MAX_RAND. For scanning intervals greater than or equal to 1.28 seconds MAX_RAND will be 1023, however, for scanning intervals less than 1.28s MAX_RAND may be as small as 127. A profile that uses a DIAC may choose to use a smaller MAX_RAND than 1023 even when the scanning interval is greater than or equal to 1.28s. The slave will return to the CONNECTION or STANDBY state for the duration of at least RAND time slots. Before returning to the CONNEC- TION and STANDBY state, the device may go through the page scan substate. After at least RAND slots, the device will add an offset of 1 to the phase in the inquiry hop sequence (the phase has a 1.28 second resolution) and return to the inquiry scan sub state again. If the slave is triggered again, it will repeat the procedure using a new RAND. The offset to the clock accumulates each time an FHS packet is returned. During a period when the inquiry device is broadcasting inquiry packets, a slave may respond multiple times, but on different frequencies and at different times. Reserved synchronous slots should have priority over response packets; that is, if a response packet overlaps with a reserved synchronous slot, it will not be sent, but the next inquiry message is awaited. If a device has extended inquiry response data to send, but the extended inquiry response packet overlaps with a reserved synchronous slot, the FHS packet may be sent with the EIR bit set to zero.

The messaging during the inquiry routines is summarized as follows:

In step 1, the master transmits an inquiry message using the inquiry access code and its own clock.

In step 2, the slave responds with the FHS packet containing the slave's BLUETOOTH protocol device Address, native clock and other slave information. This FHS packet is returned at times that tend to be random. The FHS packet is not acknowledged in the inquiry routine, but it is retransmitted at other times and frequencies as long as the master is probing with inquiry messages.

In step 3, if the slave has non-zero extended inquiry response data, it sends an extended inquiry response packet to the master.

3. Extended Inquiry Response

An Extended Inquiry Response may be used to provide miscellaneous information during the inquiry response procedure. Data types are defined for such things as local name and supported services, information that otherwise would have to be obtained by establishing a connection. A device that receives a local name and a list of supported services in an extended inquiry response does not have to connect to do a remote name request and a service discovery protocol (SDP) service search, thereby shortening the time to useful information. If the slave transmits an extended inquiry response packet, it is transmitted 1250 microseconds after the start of the inquiry response packet. The extended inquiry response packet is received by the master at the hop frequency when the inquiry message received by the slave was first in the master-to-slave slot. The extended inquiry response packet is an Asynchronous Connection-oriented Logical transport (ACL) data medium rate (DM) packet with type DM1, DM3, DM5, DH1, DH3 or DH5. To minimize interference it is recommended to use the shortest packet that is capable of containing the data. The packet is sent on the same frequency as the (frequency hop synchronization) FHS packet, 1250 microseconds after the start of the FHS packet. In the packet header, the logical transport address (LT_ADDR) may be set to zero. TYPE may be one of DM1, DM3, DM5, DH1, DH3 or DH5. FLOW, ARQN and SEQN may all be set to zero and ignored during receipt. (ARQN is automatic repeat address acknowledgement indication and SEQN is sequential numbering scheme.) The header error check (HEC) linear feedback shift register (LFSR) may be initialized with the same default check initialization (DCI) as for the FHS packet. In the payload header, logical link identifier (LLID) may contain the value 10 (start of a logical link control and adaptation control (L2CAP) message or no fragmentation). FLOW may be set to zero and ignored upon receipt. The length of the payload body (LENGTH) may be smaller than or equal to 240 bytes. The cyclic redundancy check (CRC) linear feedback shift register (LFSR) may be initialized with the same DCI as for the FHS packet. The data whitening LFSR may be initialized with the same value as for the FHS packet. The length of the payload body (LENGTH) may be smaller than or equal to 240 bytes. The CRC LFSR may be initialized with the same DCI as for the FHS packet. The data whitening LFSR may be initialized with the same value as for the FHS packet. The payload data has two parts, a significant part followed by a non-significant part. The significant part contains a sequence of data structures. The non-significant part contains all zero octets. The baseband may not change any octets in the significant part. When transmitting data, the non-significant part octets may be omitted from the payload. A device may store a single extended inquiry response packet. This packet may be used with all inquiry access codes (IACs).

4. Page

Page is the initial phase of the connection procedure where a device transmits a train of page messages until a response is received from the target device, is stopped by host or a timeout occurs. Page scan is a procedure where a device listens for page messages received on its page scan physical channel. In forming a connection, the paging device will become the master and the page scan device will become the slave in a piconet. Initially, after the slave has received an inquiry message, an inquiry response packet is transmitted from the slave to the master. The inquiry response packet sent from the slave contains information necessary for the inquiring master to page the slave, such as BLUETOOTH protocol device Address of the slave device. The necessary information may be received by other means, such as Out-Of-Band pairing. Also the page is not away always preceded with inquiry, because the address may be known beforehand (for example saved from previous connections). In the paging procedure, the BLUETOOTH protocol device that will become the master carries out a page procedure by transmitting page messages in connection request packets to the specified BLUETOOTH protocol slave device that carries out a page scanning procedure to listen for connection request packets from the paging device. A connectable BLUETOOTH protocol device listens for a page request on its page scan channel and, once received, enters into a sequence of exchanges with the paging device. In order for a device to connect to another device, it performs frequency hopping all page scan channel frequencies, sending a page request on each frequency and listening for a response. The page scan channel uses an access code derived from the scanning device's BLUETOOTH protocol device Address BD_ADDR to identify communications on the channel. The page scan channel uses a slower hopping rate than the hop rate of the paging device, using the BLUETOOTH protocol device clock of the scanning device as an input. A device listening on its page scan channel remains passive until it receives a page request from another BLUETOOTH protocol device, identified by the page scan channel access code. The two devices will then follow the page procedure to form a connection where the paging device is the master and the page scan device is the slave in a piconet. In order for a paging device to connect to another BLUETOOTH protocol device, it uses the page scan channel of the target device in order to send page requests. If the paging device does not know the phase of the target device's page scan channel, it does not know the current hop frequency of the target device. Therefore, the paging device transmits page requests on each of the page scan hop frequencies and listens for a page response. This is done at a faster hop rate, allowing the paging device to cover all page scan frequencies in a short period of time. The paging device may have some knowledge of the target device's BLUETOOTH protocol clock, such as indicated during a previous inquiry transaction between the two devices, and may be able to predict the phase of the target device's page scan channel. It may use this information to optimize the synchronization of the paging and page scanning process and speed up the formation of the connection.

5. Service Discovery Protocol (SDP)

BLUETOOTH protocol devices are designed to find other BLUETOOTH protocol devices within their radio communications range and to discover what services they offer, using a service discovery protocol (SDP). The SDP searching function relies on links being established between the requesting BLUETOOTH protocol device in a client role and the responding BLUETOOTH protocol device in a server role. Once a link has been established, it can be used to find out about services in the responding BLUETOOTH protocol device and how to connect to them.

Service Discovery Protocol (SDP) is used to allow devices to discover what services each other support, and what parameters to use to connect to them. For example, when connecting a mobile phone to a BLUETOOTH protocol headset, SDP will be used to determine which BLUETOOTH protocol profiles are supported by the headset (headset profile, hands free profile, advanced audio distribution profile, etc.) and the protocol multiplexor settings needed to connect to each of them. Each service is identified by a Universally Unique Identifier (UUID), with official services (BLUETOOTH protocol profiles) assigned a short form UUID (16 bits rather than the full 128).

C. WLAN Communication Technology

1. IEEE 802.11 WLAN

The IEEE 802.11 standard specifies methods and techniques of an exemplary wireless local area network (WLAN) operation. examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j, k, n, r, s, u, v, and z protocols, into the base standard IEEE 802.11-2012, Wireless Medium Access Control (MAC) and Physical Layer (PHY) Specifications, February 2012 (incorporated herein by reference). Since then, emerging broadband applications have stimulated interest in developing very high-speed wireless networks for short range communication, for example, the planned IEEE 802.11 ac, and the planned IEEE 802.11 ad WLAN specifications that are to provide a very high throughput in higher frequency bands. Applications of these IEEE 802.11 standards include products such as consumer electronics, telephones, personal computers, and access points for both for home and office.

An IEEE 802.11 WLAN may be organized as an independent basic service set (IBSS) or an infrastructure basic service set (BSS). The access point (AP) in an infrastructure basic service set (BSS) IEEE 802.11 WLAN network, is a central hub that must relay all communication between the mobile wireless devices (STAs) in an infrastructure BSS. If a STA in an infrastructure BSS wishes to communicate a frame of data to a second STA, the communication must take two hops. First, the originating STA transfers the frame to the AP. Second, the AP transfers the frame to the second STA. In an infrastructure BSS, the AP either transmits Beacons or responds to probes received from STAs for discover purposes. After a possible authentication of a STA that is conducted by the AP, an association occurs between the AP and a STA enabling data traffic to be exchanged with the AP. The Access Point (AP) in an Infrastructure BSS may bridge traffic out of the BSS onto a distribution network.

The IEEE 802.11 WLAN uses two types of transmission: Distributed Coordination Function (DCF) and Point Coordination Function (PCF). DCF employs Carrier Sense Multiple Access with Collision Avoidance (CSMA/CA). Every packet sent is positively acknowledged by the receiver. A transmission begins with a Request to Send (RTS) and the receiver responds with a Clear to Send (CTS). The channel is cleared by these two messages, since all STAs that hear the CTS will suppress their own start of a transmission. Then when data packets are transmitted, each has a Network Allocation Vector (NAV) containing a duration value to reserve the channel for the sender and receiver for an interval after the current packet, equal to the NAV duration. The value of the NAV decrements with the passage of time. Once the sender and receiver have reserved the channel, they may hold it for the remaining duration of the NAV value. The last acknowledgement packet (ACK) contains a NAV value of zero, to immediately release the channel. The Point Coordination Function (PCF) is a polling method among the STAs of the BSS, which is coordinated by the access point.

IEEE 802.11 authentication operates at the link level between IEEE 802.11 STAs. IEEE Std 802.11 attempts to control LAN access via the authentication service. IEEE 802.11 authentication is a station service that may be used by all STAs to establish their identity to STAs with which they communicate in both infrastructure and IBSS networks. If a mutually acceptable level of authentication has not been established between two STAs, then an association is not established. IEEE 802.11 defines two authentication methods: Open System authentication and Shared Key authentication. Open System authentication admits any STA to the distribution system. Shared Key authentication relies on wired equivalent privacy to demonstrate knowledge of an encryption key. The IEEE 802.11 authentication mechanism also allows definition of new authentication methods. A robust security network association (RSNA) supports authentication based on IEEE 802.1X-2004, or preshared keys (PSKs). IEEE 802.1X authentication utilizes the Extensible Authentication Protocol (EAP) (IETF RFC 3748-2004) to authenticate STAs and an authentication server (AS) with one another. In IEEE 802.1X, a STA being authenticated and the authenticator device exchange protocol information via the IEEE 802.1X Uncontrolled Port. The IEEE 802.1X Controlled Port is blocked from passing general data traffic between two STAs until an IEEE 802.1X authentication procedure completes successfully over the IEEE 802.1X Uncontrolled Port.

The access point (AP) in an infrastructure BSS assists those mobile wireless devices (STAs) attempting to save power. The legacy IEEE 802.11e Wireless LAN standards provides for support of low power operation in handheld and battery operated STAs, called automatic power save delivery (APSD). A STA capable of APSD and currently in the power saving mode, will wake up at predetermined beacons received from the AP to listen to a Traffic Indication Map (TIM). If existence of buffered traffic waiting to be sent to the STA is signaled through the TIM, the STA will remain awake until AP sends out all the data. The STA does not need to send a polling signal to the AP to retrieve data, which is the reason for the term "automatic" in the acronym APSD.

A Traffic Indication Map (TIM) is a field transmitted in beacon frames, used to inform associated wireless client devices that the access point has buffered data waiting to be transmitted to them. Access points buffer frames of data for wireless client devices while they are sleeping in a low-power state. The access point transmits beacons at a regular interval, the target beacon transmission time (TBTT). The Traffic Indication Map (TIM) information element in the periodically transmitted beacon frame, indicates which wireless client devices have buffered data waiting to be accessed in the access point. Each frame of buffered data is identified by an association identifier (AID) associated with a specific wireless client device. The AID is used to logically identify the wireless client device to which buffered frames of data are to be delivered. The traffic indication map (TIM) contains a bitmap, with each bit relating to a specific association identifier (AID). When data is buffered in the access point for a particular association identifier (AID), the bit is "1". If no data is buffered, the bit for the association identifier (AID) is "0". Wireless client devices must wake up and listen for the periodic beacon frames to receive the Traffic Indication Map (TIM). By examining the TIM, a wireless client device may determine if the access point has buffered data waiting for it. To retrieve the buffered data, the wireless client device may use a power-save poll (PS-Poll) frame. After transmitting the PS-Poll frame, the client mobile station may stay awake until it receives the buffered data or until the bit for its association identifier (AID) in the Traffic Indication Map (TIM) is no longer set to "1", indicating that the access point has discarded the buffered data.

Two variations of the APSD feature are unscheduled automatic power save delivery (U-APSD) and scheduled automatic power save delivery (S-APSD). In U-APSD, the access point (AP) is always awake and hence a mobile wireless device (STA) in the power save mode may send a trigger frame to the AP when the STA wakes up, to retrieve any queued data at the AP. In S-APSD, the AP assigns a schedule to a STA and the STA wakes up, sends a power save poll packet to the AP in order to retrieve from the AP any data queued. An AP may maintain multiple schedules either with the same STA or with different STAs in the infrastructure BSS network. Since the AP is never in sleep mode, an AP will maintain different scheduled periods of transmission with different STAs in the infrastructure BSS network to ensure that the STAs get the maximum power savings.

2. Wi-Fi Protected Setup/Wi-Fi Simple Configuration (WSC)

Network setup for IEEE 801.11 WLANs has been simplified by the Wi-Fi Protected Setup™ system that is included in most access points. The Wi-Fi Alliance published the Wi-Fi Protected Setup (WPS) specification 1.0, Wi-Fi Protected Setup Specification, Version 1.0h, December 2006 (incorporated herein by reference). The Wi-Fi Simple Configuration (WSC) Specification, Version 2.0, Dec. 20, 2010, (incorporated herein by reference), updates the Wi-Fi Protected Setup Specification, Version 1.0h. The acronym WSC, for Wi-Fi Simple Configuration Specification, may be used interchangeably with the acronym WPS, for Wi-Fi Protected Setup. Wi-Fi Protected Setup facilitates the initial setting up of IEEE 802.11 devices in a Wi-Fi infrastructure network so that they may be more easily configured with security features and so that that new Wi-Fi devices may be added to the network. Wi-Fi Protected Setup allows access points to be set up by entering a PIN. The Protected Setup system uses this information to send data to a computer connected to the access point, to complete the network setup. Wi-Fi Protected Setup defines new IEEE 802.11 information elements (IE) that are included in beacons, probe requests and probe responses. The purpose of these IEs is to advertise the presence of devices that are capable of performing Wi-Fi Protected Setup operations.

Initial discovery of Wi-Fi Simple Configuration devices is accomplished using IEEE 802.11 Information Elements in management frames (Beacon, Probe Request, and Probe Response). If the Enrollee decides to pursue a connection to the network, it initiates an IEEE 802.1X/EAP connection for the Extensible Authentication Protocol (EAP)-based Registration Protocol. The Wi-Fi Simple Configuration Information Element complies with the IEEE 802.11 Information Element format and indicates specific data necessary for network information, capabilities and modes, to configure an Enrollee for the wireless network and to report problems with the Enrollee associating with a specified wireless network with the supplied settings.

The Wi-Fi Protected Setup 1.0 standard defines three types of components in a network: a Registrar, an Enrollee, and an Access Point (AP). A Registrar is a component with the authority to issue and revoke credentials to a network. A Registrar may be integrated into an AP or it may be separate from the AP. An Enrollee is a component seeking to join a wireless LAN network. An Authenticator is an AP functioning as a proxy between a Registrar and an Enrollee. A Registrar wireless device configures the Enrollee wireless device, and the AP acts as an Authenticator to proxy the relevant messages between the Registrar and the Enrollee. The messages exchanged in the session are a series of Extensible Authentication Protocol (EAP) request/response messages, ending with the Enrollee reconnecting to the network with its new configuration. EAP is an authentication framework defined in RFC 5247, for providing the transport and usage of keying material and parameters needed to establish a secure Wi-Fi network. The Wi-Fi Simple Configuration Specification, Version 2.0, Dec. 20, 2010, (incorporated herein by reference), updates the Wi-Fi Protected Setup Specification, Version 1.0h.

A standalone AP that supports Wi-Fi Protected Setup, includes a built-in Registrar and does not use an external Registrar. In initial WLAN setup with Wi-Fi Protected Setup, when initializing in a standalone mode, a Wi-Fi Protected Setup AP automatically chooses a random SSID and channel. A standalone AP that includes a Wi-Fi Protected Setup Registrar, issues keys to Enrollees via the Registration Protocol.

When an Enrollee is initialized, it looks for Beacons from APs and sends probe requests with the WSC information element (IE), into either selected networks or into each network sequentially. It may also send probe requests to each IEEE 802.11 channel with the WSC IE included. It looks for the WSC IE in probe-responses that it receives and can engage with one or more Registrars to further discover Registrar capabilities and to see if the user has selected a Registrar. The Enrollee may continue looking for selected Registrar flags in Beacons, probe-responses and any M2 messages and may cease scanning when it finds a Registrar indicating that it is prepared to configure the Enrollee.

The following example describes an example in-band setup procedure using Wi-Fi Protected Setup for adding Member devices using a Standalone AP/Registrar. The user may convey the Enrollee's device password to the AP/Registrar using keyboard entry or an out-of-band channel with Near-Field Communication (NFC) Connection Handover. This example does not show the exchange of preliminary M1 and M2D messages that may take place after the probe message exchange, because the Enrollee may be waiting for the user to configure the AP/Registrar with the Enrollee's device password.

1. The Enrollee sends its Discovery data in a probe request to a Wi-Fi Protected Setup AP or ad hoc wireless Registrar. The AP or wireless Registrar responds with its own Discovery data in the probe response.

2. The user may be prompted to enter the Enrollee's device password into the AP/Registrar using a keypad interface or an out-of-band channel.

3. The Enrollee connects and initiates the IEEE 802.1X port-based Network Access Control procedure for port-based authentication.

4. The Enrollee and Registrar exchange messages M1-M8 to provision the Enrollee.

5. The Enrollee disassociates and reconnects, using its new WLAN authentication Credential. The Enrollee is now connected to the network with its new configuration.

3. Authentication in Wi-Fi Protected Setup/Wi-Fi Simple Configuration

The Wi-Fi Simple Configuration Specification, Version 2.0 (renamed from the original name "Wi-Fi Protected Setup"), uses the IEEE 802.1X Port-Based Authentication and Extensible Authentication Protocol (EAP) to transport in-band Registration Protocol messages. This protocol is mapped onto a custom EAP method described below. Wi-Fi Simple Configuration does not require the AP to support remote authentication dial-in user service (RADIUS) (IETF RFC 2865-2000), and the network need not include an authentication server. In fact, many Wi-Fi Simple Configuration APs may support IEEE 802.1X only to configure Wi-Fi Protected Access 2 (WPA2)-Personal Credentials using Wi-Fi Simple Configuration. Enrollees using Wi-Fi Simple Configuration are not granted direct access to the WLAN through the Wi-Fi Simple Configuration custom EAP method. The EAP method is used to configure the Enrollee with a Credential that can be used subsequently with whatever access method is supported by that WLAN. For example, if the AP only supports WPA2-Personal with a network-wide shared Pre-Shared Key (PSK), then the Enrollee would run the 802.1X exchange to obtain the PSK, disassociate, and then reconnect and use WPA2-Personal to access the WLAN. Alternatively, if the AP supports 802.1X authentication, the Enrollee may first run the Wi-Fi Simple Configuration EAP method to obtain a shared secret Credential and then reconnect using that secret in conjunction with another EAP method to access the WLAN.

The Wi-Fi Simple Configuration EAP method (EAP-WSC) can be used for Registrar and Enrollee discovery and for Credential establishment. The first time the Enrollee encounters a new WLAN, it sends out its Discovery information and executes the EAP-WSC method. In both the Discovery message and in Registration Protocol Message M1, the Enrollee provides information about itself to the WLAN. The M2 and M2D messages sent to the Enrollee likewise provide information about the available Registrars. When the Enrollee first discovers and attempts to connect to the WLAN, the WLAN's Registrar(s) may not yet know the Enrollee's device password. Therefore, Registrars without the device password respond with M2D messages. Although these M2D messages are unauthenticated, they can help Enrollees with rich user interfaces, to guide the user through the enrollment process.

As the Enrollee scans over the M2D messages sent by the network, it may discover that none of them possesses its device password. At this point, the Enrollee has an opportunity to prompt the user to perform a trust bootstrapping operation such as connecting an available out-of-band channel or entering a device password into one of the available Registrars. If the user decides to enter the Enrollee's device password into the Registrar, the Enrollee can reconnect and run the EAP method once more to perform the complete Registration Protocol. If the Enrollee has no user interface to lead the user through the enrollment, it is likely that one or more of the WLAN's Registrars can do this. Both the Registrar and the Enrollee are given sufficient information about each others' capabilities through the EAP method to successfully lead the user through the enrollment. If the user decides to use an out-of-band channel for registration, then message M2 is implicitly authenticated by the channel and can carry the network configuration data.

The AP functions as the EAP authenticator on the WLAN. Thus, the AP generates EAP Request messages and Enrollees and Registrars generate EAP Responses. If the Registrar is external to the AP, then it uses universal plug and play (UPnP) to exchange Registration Protocol messages with the AP. A Registrar may also function in the role of an 802.1X authenticator, which is useful for networks with legacy APs.

The Wi-Fi Simple Configuration EAP method uses EAP, as specified in RFC 3748, and Extensible Authentication Protocol (EAP) over LAN (EAPoL), as specified in IEEE 802.1X-2001, but does not represent a network authentication protocol. Rather Wi-Fi Simple Configuration utilizes the 802.1X data connection for acquiring settings necessary for connecting to the network and the resulting EAP exchange must always terminate with EAP-Failure.

When the Enrollee decides to connect to the network and run the Wi-Fi Simple Configuration EAP method, it associates with the AP and sends an EAPoL-Start message. The AP responds with an EAP-Request/Identity. The Enrollee sends an EAP-Response/Identity containing the defined Wi-Fi Alliance name for a Simple Configuration Enrollee ("WFA-SimpleConfig-Enrollee-1-0"). This causes the AP to start running the Simple Configuration EAP method. The Registration Protocol messages are exchanged until M8 is received and validated by the Enrollee. If it successfully processes M8, the Enrollee sends an EAP-Response/Done message to the authenticator, which sends the WSC_Done message to any External Registrar and the authenticator returns an EAP-Failure message to the Enrollee. An Enrollee should assume that the received credentials are valid after successfully processing message M8 and sending the WSC_Done message. The Enrollee then disassociates and reconnects with the Credential obtained from M8's ConfigData. If M2D is received by the Enrollee, it should respond with an ACK message so that the AP can continue to send it discovery messages from other Registrars. After the AP sends an EAP-failure to the Enrollee, the Enrollee can do one of two things (given that the AP did not de-authenticate the Enrollee after sending the EAP-Failure): it can disconnect from the AP and reconnect some time later to rerun the Wi-Fi Simple Configuration EAP method by sending an EAPoL-Start message or it can stay connected to the AP and rerun the Wi-Fi Simple Configuration EAP method by sending another EAPoL-Start message.

Once the Enrollee sends an M3 message, both the Registrar and the Enrollee must proceed in lock-step fashion until either a failure or until success occurs (indicated by the Done response message). If the Enrollee (IEEE 802.1X supplicant) detects any errors in these later phases, it responds by sending a NACK message and transitioning to the termination state to terminate the connection. At this point, the Enrollee computes a fresh device password for use in the next instance of the Registration Protocol. If the same password is reused with multiple instances of the protocol, it will be susceptible to active attack.

The Registration Protocol Messages M1 to M8 are described in the Wi-Fi Simple Configuration Specification, Version 2.0. They include an exchange of public keys, description of the sending device, including its MAC address and device capabilities, and various message authentication values, culminating in the Registrar sending to the Enrollee credentials for accessing the network.

A credential is a data structure issued by a Registrar to an Enrollee, allowing the latter to gain access to the network. With out-of-band configuration, WLAN credentials are sent across the out-of-band channel to the Enrollee. The NFC interfaces operating in peer-to-peer mode between an AP or Group Owner (GO) having an integrated Registrar and an Enrollee device, have the strongest security properties supported by the Wi-Fi Simple Configuration Specification, because practical man-in-the-middle attacks against NFC are not feasible. In this mode, a 1536-bit Diffie-Hellman exchange is performed over the NFC interface, and WLAN settings are encrypted using 128-bit Advanced Encryption Standard (AES) and delivered over the same interface between an AP or Group Owner (GO) and an Enrollee device. The Diffie-Hellman public keys and WLAN settings are implicitly authenticated by both the Registrar and the Enrollee, because they are received over the NFC channel.

4. Wi-Fi Direct—Software Access Points

The Wi-Fi Alliance has developed a Wi-Fi Peer-to-Peer technology named Wi-Fi Direct™ that is specified in the Wi-Fi Alliance Peer-to-Peer Specification, October 2010 (incorporated herein by reference). Wi-Fi Direct, is also referred to herein as Peer-to-Peer or P2P. Wi-Fi Direct enables IEEE 802.11a, g, or n devices to connect to one another, peer-to-peer, without prior setup or the need for wireless access points. Wi-Fi Direct embeds a software access point into any device, which provides a version of Wi-Fi Protected Setup. When a device enters the range of a STA supporting Wi-Fi Direct (a Wi-Fi Direct device), it can connect to it and then gather setup information using a Wi-Fi Protected Setup transfer. Devices that support Wi-Fi Direct may discover one another and advertise available services. Wi-Fi Direct devices support typical Wi-Fi ranges and the same data rates as can be achieved with an 802.11a, g, or n infrastructure connection. When a device enters the range of the Wi-Fi Direct device, it may connect to it using the existing protocol, and then gather setup information using a Wi-Fi Protected Setup 2.0 transfer.

Wi-Fi Direct enables IEEE 802.11 devices that support Wi-Fi Direct, to connect to one another, point-to-point. The specification may be implemented in any Wi-Fi device. Devices that support the specification will be able to discover one another and advertise available services. Wi-Fi Direct devices will support typical Wi-Fi ranges and the same data rates as can be achieved with an infrastructure connection. Wi-Fi Direct provides point-to-point connections for networks by embedding a software access point into any device that wishes to support Wi-Fi Direct. The soft AP provides a version of Wi-Fi Protected Setup 2.0. When a device enters the range of the Wi-Fi Direct device, it may connect to it using the existing protocol, and then gather setup information using a Wi-Fi Protected Setup 2.0 transfer.

Wi-Fi Direct-certified devices may create direct connections between Wi-Fi client devices without requiring the presence of a traditional Wi-Fi infrastructure network of an access point or router. Wi-Fi Direct-certified devices support connection with existing legacy Wi-Fi devices using the IEEE 802.11 a/g/n protocols. Wi-Fi Direct Device Discovery and Service Discovery features allow users to identify available devices and services before establishing a connection, for example, discovering which Wi-Fi device is a printer.

A Wi-Fi Direct device may support an infrastructure network of an access point or router in addition to a peer-to-peer (P2P) connection. Wi-Fi Direct devices may join infrastructure networks as stations (STAs) and may support Wi-Fi Protected Setup enrollee functionality. Wi-Fi Direct devices may connect by forming Groups in a one-to-one or one-to-many topology. The Groups functions in a manner similar to an infrastructure basic service set (BSS). A single Wi-Fi Direct device will be the Group Owner (GO) that manages the Group, including controlling which devices are allowed to join and when the Group is started or terminated. The Group Owner (GO) will appear as an access point to legacy client's devices.

Wi-Fi Direct devices include a Wi-Fi Protected Setup Internal Registrar functionality and communication between Clients in the Group. Wi-Fi Direct devices may be a Group Owner (GO) of a Group and may be able to negotiate which device adopts this role when forming a Group with another Wi-Fi Direct device. A Group may include both Wi-Fi Direct devices and legacy devices (i.e., that are not compliant with the Wi-Fi Alliance Peer-to-Peer Specification). Legacy Devices can only function as Clients within a Group.

Wi-Fi Direct devices support Discovery mechanisms. Device Discovery is used to identify other Wi-Fi Direct devices and establish a connection by using a scan similar to that used to discover infrastructure access points. If the target is not already part of a Group, a new Group may be formed. If the target is already part of a Group, the searching Wi-Fi Direct device may attempt to join the existing Group. Wi-Fi Protected Setup may be used to obtain credentials from the Group Owner (GO) and authenticate the searching Wi-Fi Direct device. Wi-Fi Direct devices may include Service Discovery that enables the advertisement of services supported by higher layer applications to other Wi-Fi Direct devices. Service Discovery may be performed at any time (e.g. even before a connection is formed) with any other discovered Wi-Fi Direct device.

A Group may be created by a single Wi-Fi Direct device, such as when connecting a legacy device. When forming a connection between two Wi-Fi Direct devices, a Group may be formed automatically and the devices may negotiate to determine which device is the Group Owner. The Group Owner may decide if this is a temporary (single instance) or persistent (multiple, recurring use) Group. After a Group is formed, a Wi-Fi Direct device may invite another Wi-Fi Direct device to join the Group. The decision of whether or not to accept an invitation may be left to the invited Wi-Fi Direct device.

Wi-Fi Direct Devices may participate in multiple Groups. A Wi-Fi Direct Device that may be in a Group while maintaining a WLAN infrastructure connection at the same time is considered a Concurrent Device or a dual stack device. For example, a laptop connected directly to a printer while simultaneously using a WLAN connection is operating as a Concurrent Device. Concurrent connections may be supported by a single radio and may support connections on different channels. Concurrent operation may be supported by multiple protocol stacks, for example, one for operation as a WLAN-STA and one for operating as a Wi-Fi Direct device. For example, two separate physical MAC entities may be maintained, each associated with its own PHY entity, or they may use a single PHY entity supporting two virtual MAC entities.

The Wi-Fi Peer-to-Peer Technical Specification v1.1, 2010 published by the Wi-Fi Alliance, provides for provisioning in Wi-Fi Direct networks. Provisioning is a phase of peer-to-peer group formation in which credentials for the peer-to-peer group are exchanged based on the use of Wi-Fi Simple Configuration. Credentials are information that is required to join a peer-to-peer group as defined in the Wi-Fi Simple Configuration Specification.

To allow for peer-to-peer device configuration, peer-to-peer devices may delay starting the provisioning phase until the expiration of the larger of the peer-to-peer group owner's (GO) configuration time and the peer-to-peer client's client configuration time, based on respective configuration timeout attributes exchanged during a preceding group owner negotiation.

The peer-to-peer device selected as peer-to-peer group owner (GO) during group owner negotiation may start a peer-to-peer group session using the credentials it intends to use for that group. The peer-to-peer group owner (GO) may use the operating channel indicated during group owner negotiation, if available. The peer-to-peer client may connect to the peer-to-peer group owner to obtain credentials. If the operating channel is not available the peer-to-peer group owner may use another channel from a channel list attribute sent in the group owner negotiation confirmation frame. The peer-to-peer client may have to scan to find the peer-to-peer group owner if the intended operating channel is not available. A group formation bit in a peer-to-peer group capability bitmap of the peer-to-peer capability attribute may be set to one until provisioning succeeds.

Provisioning may be executed in Wi-Fi Direct networks, as described, for example, in the Wi-Fi Simple Configuration (WSC) Specification, Version 2.0, Dec. 20, 2010. The peer-to-peer group owner (GO) may serve the role as the access point with an internal registrar. It will only allow association by the peer-to-peer device that it is currently with in a group formation. Since the user has entered the WSC PIN or triggered the WSC pushbutton functionality on both devices, the registrar may send an M2 message in response to an M1 message. The peer-to-peer client may serve the role as the STA enrollee. It may associate to the peer-to-peer device that it is currently with in the group formation.

If provisioning fails, then group formation ends and the peer-to-peer group owner (GO) may end the peer-to-peer group session. If provisioning fails, the peer-to-peer device may retry group formation or return to device discovery. On successful completion of provisioning in Wi-Fi Direct networks, the peer-to-peer group owner (GO) may set the group formation bit in the peer-to-peer group capability bitmap of the peer-to-peer capability attribute to zero. At this point the peer-to-peer client may join the peer-to-peer group in the Wi-Fi Direct network, using the credentials supplied during provisioning.

D. Near-Field Communication (NFC) Technology

One of the methods provided by the Wi-Fi Simple Configuration Specification, Version 2.0, is the Near-Field Communication (NFC) method, in which the user brings a new wireless client device (STA) close to an access point (AP) or Registrar of the Network to allow near field communication between the devices.

Near field communication technologies, such as radio frequency identification (RFID) technologies, comprise a range of RF transmission systems, for example standardized and proprietary systems for a large number of different purposes, such as product tagging for inventory handling and logistics, theft prevention purposes at the point of sale, and product recycling at the end of the life-cycle of the tagged product. In addition to RFID technologies, Near Field Communication (NFC) technology has recently evolved from a combination of existing contactless identification and interconnection technologies. NFC is both a "read" and "write" technology. Communication between two NFC-compatible devices occurs when they are brought within close proximity of each other: A simple wave or touch can establish an NFC connection, which is then compatible with other known wireless technologies, such as BLUETOOTH protocol or wireless local area network (WLAN).

Near-field communication (NFC) technology used in the Wi-Fi Protected Setup (WPS) standard, communicates between two NFC Devices or between an NFC device And an NFC Tag via magnetic field induction, where two loop antennas are located within each other's near field, effectively energizing a wireless contact by forming an air-core transformer. An example NFC radio operates within the unlicensed radio frequency ISM band of 13.56 MHz, with a bandwidth of approximately 2 MHz over a typical distance of a few centimeters. The NFC radio may be affixed to a new wireless client device (STA) and the user brings the NFC radio on the device close to an access point (AP) or Registrar of the Network to allow near field communication between the devices.

NFC technology is an extension of the ISO/IEC 14443 proximity-card standard (incorporated herein by reference) for contactless smartcards and radio frequency ID (RFID) devices, which combines the interface of a contactless smartcard and a reader into a single device, and uses the ISO/IEC 18092 NFC communication standard (incorporated herein by reference) to enable two-way communication. An NFC radio may communicate with both existing ISO/IEC 14443 contactless smartcards and readers, as well as with other NFC devices by using ISO/IEC 18092. The NFC Forum™, a non-profit industry association, has released specifications that enable different operation modes called: tag emulation, read/write mode, and peer to peer communication. Furthermore, NFC Forum has defined specifications for NFC Data Exchange Format (NDEF), NFC Tag Types, NFC Record Type Definition, and Connection Handover Specification. See, for example, Connection Handover Technical Specification, NFC Forum™, Connection Handover 1.2, NFCForum-TS-ConnectionHandover 1.2, 2010-07-07 (incorporated herein by reference). The ISO/IEC 18092 standard defines communication modes for Near Field Communication Interface and Protocol (NFCIP-1) using inductively coupled devices operating at the center frequency of 13.56 MHz for interconnection of computer peripherals. The ISO/IEC 18092 standard specifies modulation schemes, codings, transfer speeds and frame format of the RF interface, initialization schemes, conditions required for data collision control during initialization, and a transport protocol including protocol activation and data exchange methods.

The basic handover to a WLAN carrier stores WLAN parameters and credentials on NFC Forum Tags as part of Wi-Fi Protected Setup (WPS). The information is stored in the payload of an NFC Data Exchange Format (NDEF) record identified by the mime-type "application/vnd.wfa.wsc", known as the "WPS Record". The wireless LAN parameters and credentials information provided inside a WPS Record includes the IEEE 802.11 Service Set Identifier (SSID), authentication and encryption type deployed by the wireless network, the secret network key that a wireless station needs to authenticate with the network, and the MAC address of the device receiving the configuration (if unknown, this address is set to all-zeros). The Wi-Fi Protected Setup specification 1.0 uses the term "Registrar" for a device that is able to provide WLAN credentials and "Enrollee" for a device that wants to join a wireless network.

In the Wi-Fi Simple Configuration Specification, Version 2.0, Dec. 20, 2010, a Handover Requester with Wi-Fi capability may format an NFC Handover Request Message in the NFC Data Exchange Format (NDEF), which indicates that the requester is an IEEE 802.11 device, but which does not include any configuration information. A Handover Request may be sent via the NFC link in at least two scenarios: [1] the requester may not have yet joined a wireless domain or [2] even if the requester is already member of a WLAN network, a peer device may be in a different network and thus a Connection Handover is required to obtain the peer device's credentials. In the Wi-Fi Protected Setup specification 2.0, the Handover Selector would deduce from this message that the Handover Requester supports a Wi-Fi certified IEEE 802.11 radio. In the Wi-Fi Protected Setup specification 2.0, if the Handover Selector is a Wi-Fi device with wireless connectivity, it should respond with an NFC Handover Select Message in the NFC Data Exchange Format (NDEF), with a configuration record that includes credentials, such as network index, SSID, authentication type, encryption type, network key, and MAC address.

The NFC Data Exchange Format (NDEF) specification, NFC Forum Data Exchange Format (NDEF) Specification, NFC Forum™, 2006 (incorporated herein by reference), defines a common data format for NFC devices to exchange application or service specific data. An NDEF message is constructed of a number of NDEF records, with the first and the last record providing message begin and end markers. Between two NFC Devices, NDEF messages may be exchanged over the NFC Logical Link Control Protocol (LLCP) protocol, specified in NFC Forum Logical Link Control Protocol Specification, NFC Forum™, 2009 (incorporated herein by reference). The NFC Connection Handover specification, NFC Forum Connection Handover Specification, NFC Forum™, 2010-07-07 (incorporated herein by reference), defines the exchange of NDEF messages between two NFC Devices in a negotiated handover to discover and negotiate alternative wireless communication technologies.

The Handover Requester in the Wi-Fi Protected Setup specification 2.0, would then typically use the SSID and Network Key to enroll on the same Wi-Fi network to which the Handover Selector is connected. Further actions depend on the provision of an IP address identifying the Handover Selector, the available services, and the Handover Requester's intended activity.

E. Power Save Control for Tethering Connections

A hotspot may be a location that offers Internet access via one or more WLAN access points installed at the location. For example, stationary hotspots in coffee shops and other public places may offer free access to the Internet, up to a maximum number of users. A mobile hotspot may be a mobile telephone or smartphone that has WLAN communication capability and serves as a WLAN gateway to the cellular telephone network. The mobile hotspot enables other WLAN-capable devices that are tethered to the mobile hotspot, to relay their traffic via the WLAN connection and the cellular telephone network, to the Internet. The mobile hotspot may also relay traffic between tethered devices.

Setting up the WLAN tethering option in a smartphone may require assigning an SSID network name and passkey for the smartphone and the smartphone may automatically issue an IP address. Then, to connect another WLAN-capable device as a tethered device via a WLAN connection to the smartphone, the SSID, passkey, and IP address may need to be entered into the tethered device.

In accordance with an example embodiment of the invention, the configuration of the WLAN tethering connections with the SSID and passkeys may be automatically set up in a user friendly manner, so that that the user does not need to enter set up data into any other of the WLAN-capable devices.

WLAN tethering may consume significant power in a mobile hotspot device, since the device may need to stay active as a gateway device for other client devices, even if there is no ongoing data traffic or other client devices. Further, the mobile hotspot device may need to transmit beacons regularly to maintain connections, wasting the device's battery power.

In accordance with an example embodiment of the invention, to minimize power consumption in the mobile hotspot device, a control connection is initially established between the mobile hotspot device and the client wireless device using an out-of-band communications connection in an out-of-band communications medium, such as BLUETOOTH protocol, BLUETOOTH Low Energy, or Near Field Communications. The mobile hotspot device and the client wireless device may then exchange over the control channel, in-band communications connectivity configuration information, such as IEEE 802.11 WLAN tethering connections with the SSID and passkeys. The mobile hotspot device and the client wireless device may further exchange over the control channel, in-band communications connectivity configuration information to enable power saving features and optimize activity times in an in-band communications tethering connection with the wireless device in an in-band communications medium, such as IEEE 802.11 WLAN. In this manner the mobile hotspot device A may relay communications between the wireless device B and a wide area communications network, such as a cellular telephone network, and enable WLAN power save features of the WLAN tethering connection. The mobile hotspot device A may also relay communications between devices connected to the mobile hotspot device.

FIG. 1 is an example network diagram of a mobile wireless hotspot device A with its BLUETOOTH protocol circuit 14A and the other wireless device B with its BLUETOOTH protocol circuit 14B, exchanging information 50 that may be required to create a BLUETOOTH protocol control channel connection between the mobile hotspot device A and the wireless device B. The devices may exchange the BLUETOOTH protocol MAC address of the hotspot device, the BLUETOOTH protocol MAC address of the wireless device, BLUETOOTH protocol pairing information, and shared secret for establishing the control channel, in accordance with example embodiments of the invention. If the BLUETOOTH protocol control channel connection setup requires authentication, link keys may be initially exchanged using a Near Field Communications link, for example, with an NFC Data Exchange Format (NDEF) configuration record that includes the link keys. As a result, setting up the WLAN tethering option in a smartphone and in tethered wireless devices may be performed as a part of the initial device set-up, requiring minimal user involvement.

The figure shows two stationary hotspot access points AP1 and AP2 at fixed locations, connected to the Internet 46. When the other wireless device B is within communication range of at least one of the stationary hotspot access points AP1 or AP2, it may use that stationary access point within range to access the Internet 46. If the other wireless device B moves beyond the communication range of any of the stationary hotspot access points AP1 and AP2, the other wireless device B may still be able to access the internet 46 by becoming tethered over a WLAN connection to the mobile hotspot device A. The mobile hotspot device A may serve as a WLAN gateway to the cellular base station 18, cellular telephone network 39, internet gateway 44, and Internet 46. The mobile hotspot device A may then relay the communications traffic of the other wireless device B, via the WLAN tethering connection between the devices A and B, and via the cellular telephone network 39 and internet gateway 44, to the Internet 39.

In another example embodiment of the invention, the devices may exchange the BLUETOOTH protocol MAC address of the hotspot device, the BLUETOOTH protocol MAC address of the wireless device, BLUETOOTH protocol pairing information, and shared secret for establishing the control channel, via the cellular telephone network connected to a server that provides this information.

Figure 1A:
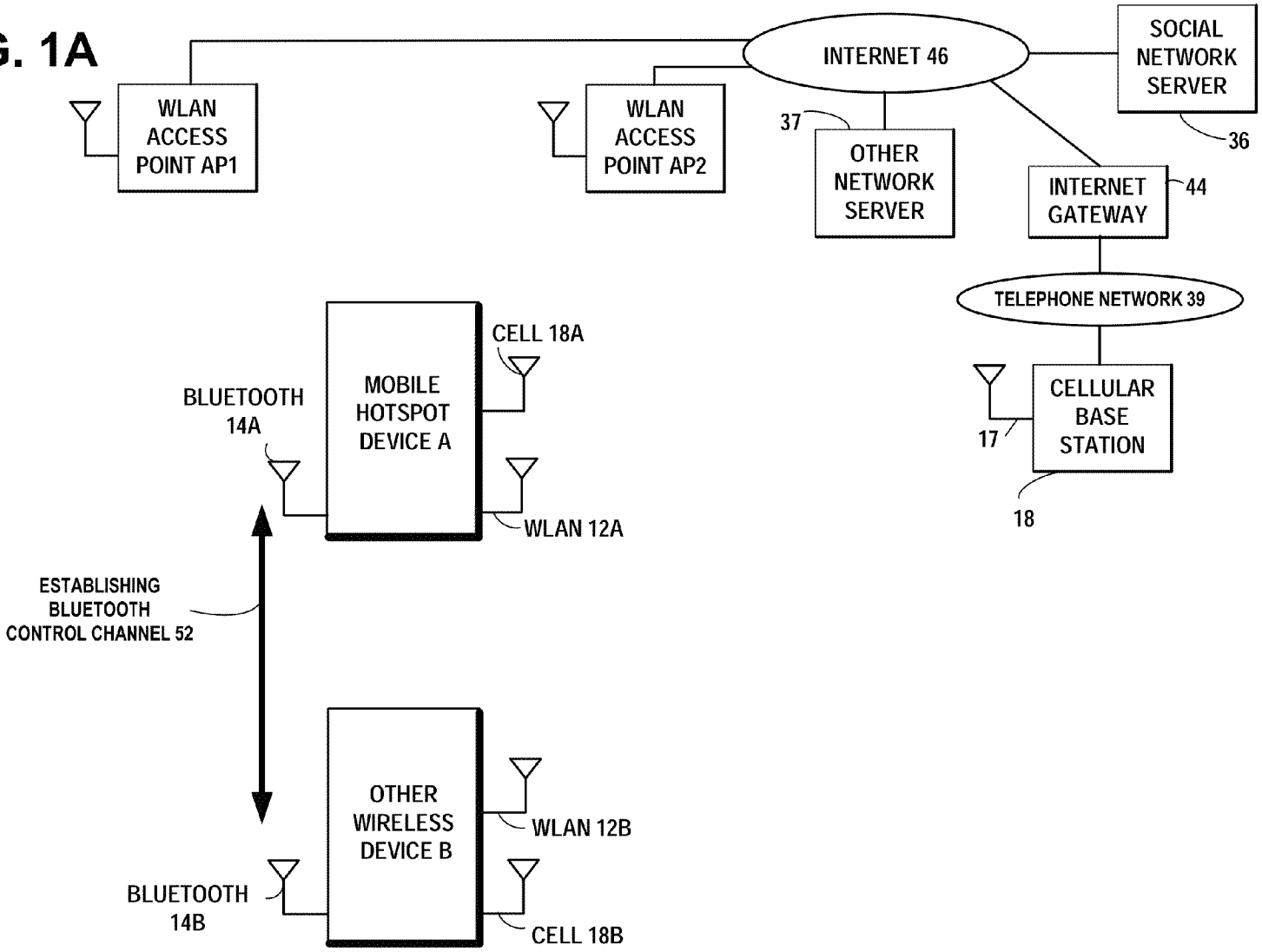
FIG. 1A is an example network diagram of the mobile wireless hotspot device A and the other wireless device B of FIG. 1, establishing the BLUETOOTH protocol control channel, in accordance with example embodiments of the invention.

FIG. 1A is an example network diagram of the mobile wireless hotspot device A and the other wireless device B of FIG. 1, establishing the BLUETOOTH protocol control channel 52 between the BLUETOOTH protocol circuit 14A and the BLUETOOTH protocol circuit 14B, in accordance with example embodiments of the invention.

Figure 1B:
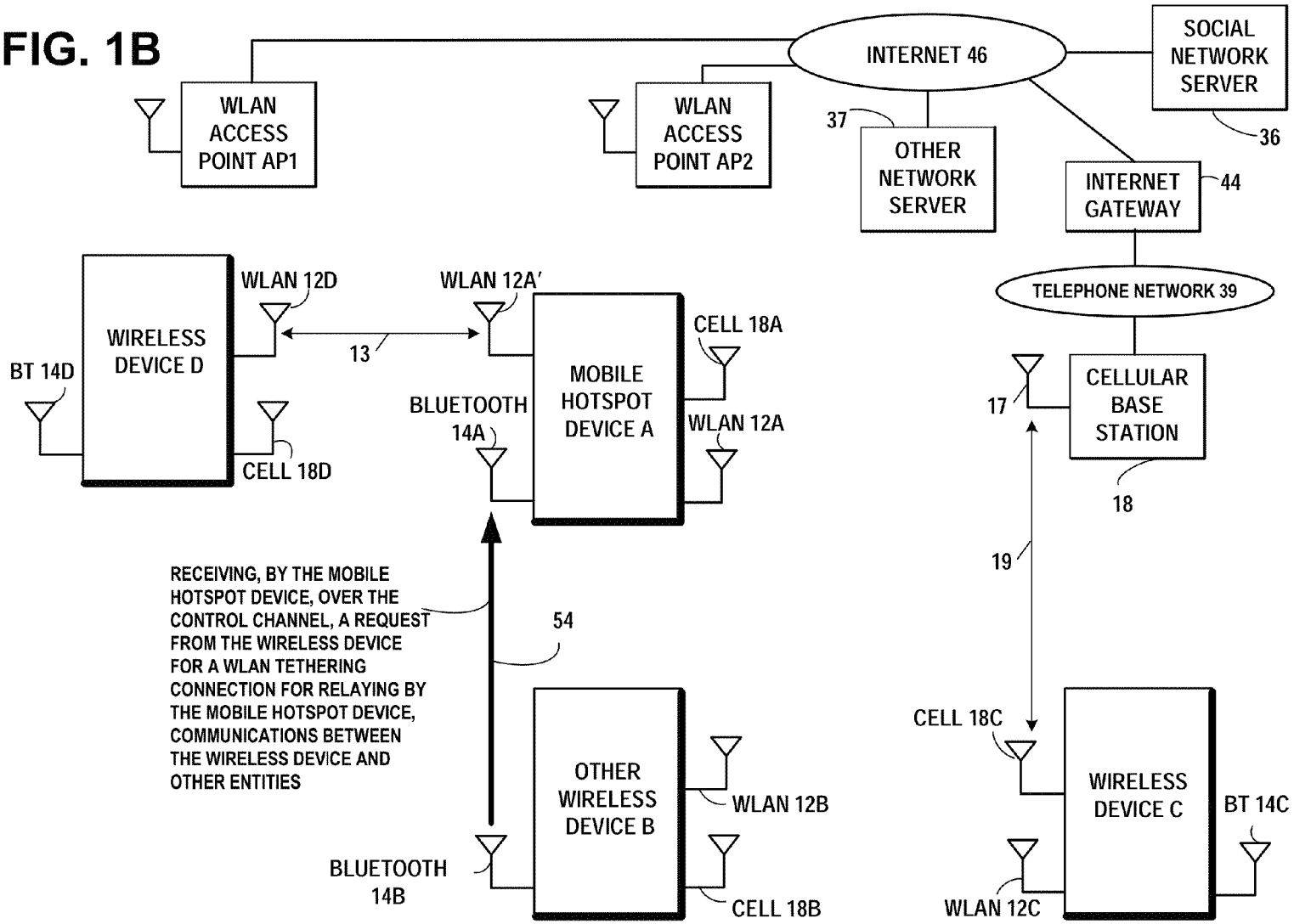
FIG. 1B is an example network diagram of the mobile wireless hotspot device A and the other wireless device B of FIG. 1A, receiving, by the mobile hotspot device, over the control channel, a request from the wireless device for a WLAN tethering connection for relaying by the mobile hotspot device, communications between the wireless device and the cellular telephone network, in accordance with example embodiments of the invention.

FIG. 1B is an example network diagram of the mobile wireless hotspot device A and the other wireless device B of FIG. 1A, In accordance with an example embodiment of the invention, request message 54 may request a tethering connection requesting the mobile hotspot device A to relay communications between wireless device B, via cellular base station 18 and Internet 46, to either the social network server 36 or the other network server 37. Request message 54 may request a tethering connection requesting the mobile hotspot device A to relay communications between wireless device B, via cellular base station 18 and over one or more cellular wireless connections 19 to one or more wireless devices C. Request message 54 may request a tethering connection requesting the mobile hotspot device A to relay communications between wireless device B and over one or more WLAN connections 13 to one or more wireless devices D connected to the hotspot device A. The figure shows a second WLAN circuit 12' on the mobile hotspot device A, shown to clarify the description of the WLAN connection 13 to the wireless device D, however, the mobile hotspot device A may accomplish its WLAN communications with the single WLAN circuit 12.

In another example embodiment of the invention, the mobile hotspot device A may receive a request from the client wireless device D over a BLUETOOTH protocol control channel between BLUETOOTH protocol circuits 14D and 14A, for a WLAN tethering connection for relaying by the mobile hotspot device A, communications between the wireless device D and one or more entities in at least one of the cellular telephone network 18 and a wireless local area network provided by the mobile hotspot device A, in accordance with example embodiments of the invention.

Figure 1C:
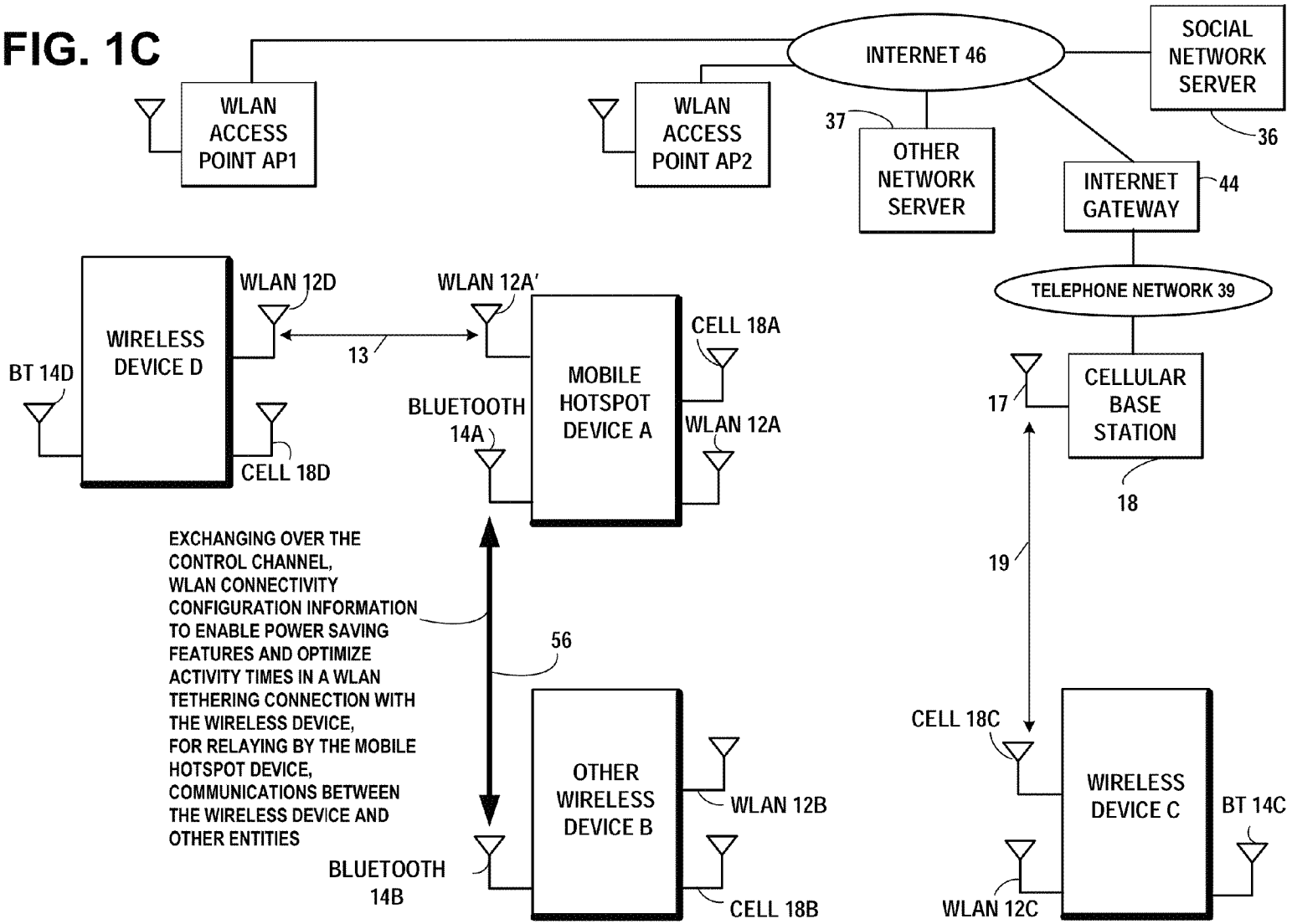
FIG. 1C is an example network diagram of the mobile wireless hotspot device A and the other wireless device B of FIG. 1B, exchanging over the control channel, by at least one of transmitting or receiving WLAN connectivity configuration information to enable power saving features and optimize activity times in A WLAN tethering connection with the wireless device, for relaying by the mobile hotspot device, communications between the wireless device and a cellular telephone network, in accordance with example embodiments of the invention.

FIG. 1C is an example network diagram of the mobile wireless hotspot device A and the other wireless device B of FIG. 1B, exchanging over the BLUETOOTH protocol control channel 52, WLAN connectivity configuration information 56. The mobile hotspot device A and the client wireless device B may exchange over the control channel 52, by at least one of transmitting or receiving in-band communications connectivity configuration information, such as IEEE 802.11 WLAN tethering connections with the SSID and passkeys, a required authentication procedure, the public key of the mobile hotspot device A, available data rates, available data throughput, a required site blacklist for virus protection, and the like.

In accordance with an example embodiment of the invention, the mobile hotspot device A and the wireless device B may further exchange over the BLUETOOTH protocol control channel 52, by at least one of transmitting or receiving in-band communications connectivity configuration information to enable power saving features and optimize activity times in the in-band communications tethering connection with the wireless device in an in-band communications medium, such as IEEE 802.11 WLAN. Example power saving features may include scheduled sleep and awake periods wherein both the mobile hotspot device A and the wireless device B observe substantially the same sleep and awake periods. Control information may also be exchanged to optimize the timing of the sleep and awake periods in the WLAN tethering connection, in accordance with example embodiments of the invention.

In another example embodiment of the invention, the mobile hotspot device A and the client wireless device D may exchange over a BLUETOOTH protocol control channel between BLUETOOTH protocol circuits 14D and 14A, by at least one of transmitting or receiving in-band communications connectivity configuration information, such as IEEE 802.11 WLAN tethering connections with the SSID and passkeys, a required authentication procedure, the public key of the mobile hotspot device A, available data rates, available data throughput, a required site blacklist for virus protection, and the like. The mobile hotspot device A and the wireless device D may further exchange over the BLUETOOTH protocol control channel between BLUETOOTH protocol circuits 14D and 14A, by at least one of transmitting or receiving in-band communications connectivity configuration information to enable power saving features and optimize activity times in the in-band communications tethering connection with the wireless device in an in-band communications medium, such as IEEE 802.11 WLAN, in accordance with example embodiments of the invention.

Figure 1D:
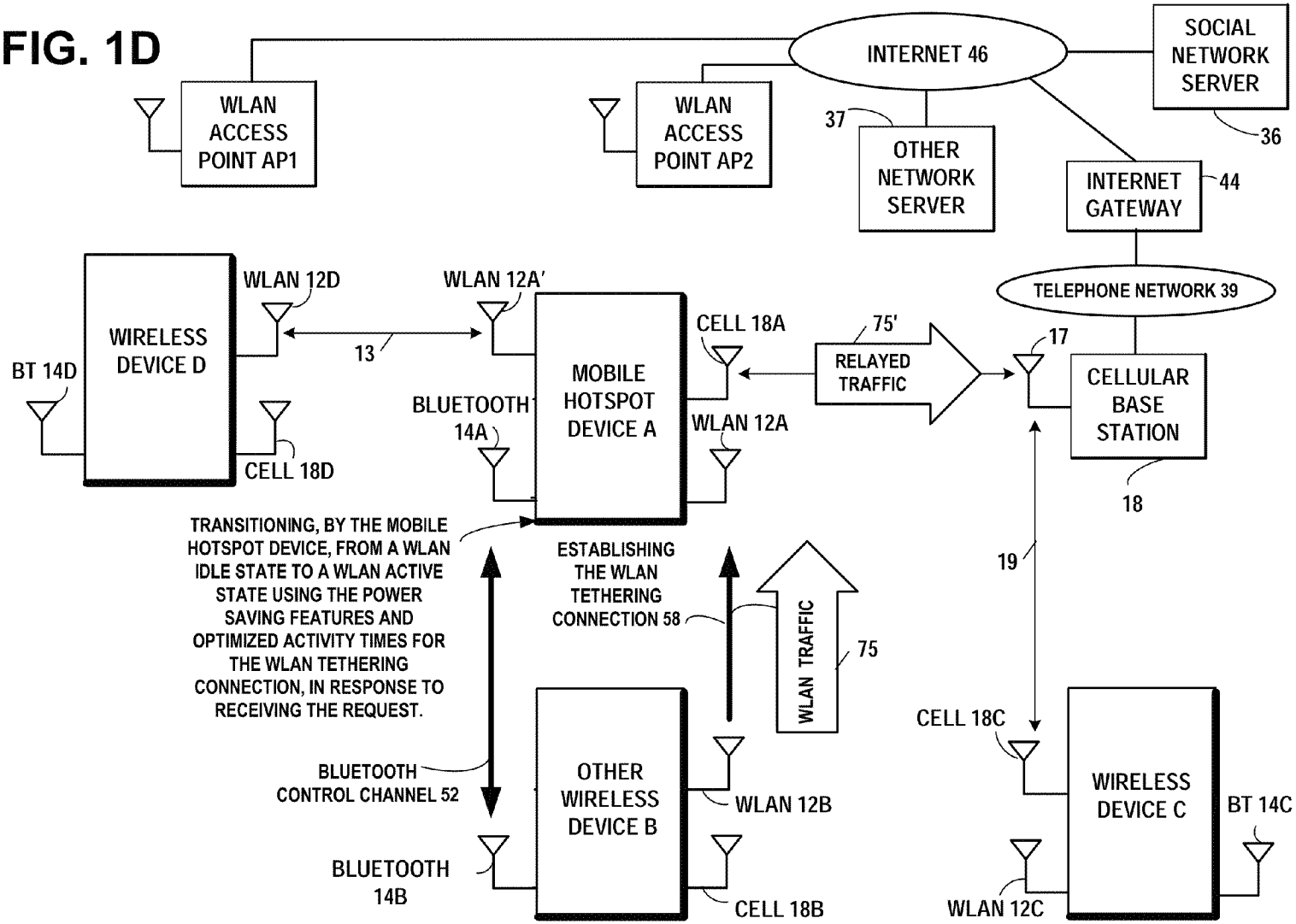
FIG. 1D is an example network diagram of the mobile wireless hotspot device A and the other wireless device B of FIG. 1C, transitioning, by the mobile hotspot device, from a WLAN idle state to a WLAN active state using the power saving features and optimized activity times for the WLAN tethering connection, in response to receiving the request, in accordance with example embodiments of the invention.

FIG. 1D is an example network diagram of the mobile wireless hotspot device A and the other wireless device B of FIG. 1C, establishing the WLAN tethering connection 58 between the WLAN circuit 12A of the mobile wireless hotspot A and the WLAN circuit 12B of the wireless device B. The figure shows the transitioning, by the mobile hotspot device A, from a WLAN idle state to a WLAN active state, using the power saving features and optimized activity times for the WLAN tethering connection 58, in response to receiving the request 54 over the BLUETOOTH protocol control channel 52, in accordance with example embodiments of the invention.

In another example embodiment of the invention, the mobile hotspot device A and the client wireless device D may establish a WLAN tethering connection between the WLAN circuit 12A' of the mobile wireless hotspot A and the WLAN circuit 12D of the wireless device B, in response to receiving the request over the BLUETOOTH protocol control channel between BLUETOOTH protocol circuits 14D and 14A, in accordance with example embodiments of the invention.

Figure 1E:
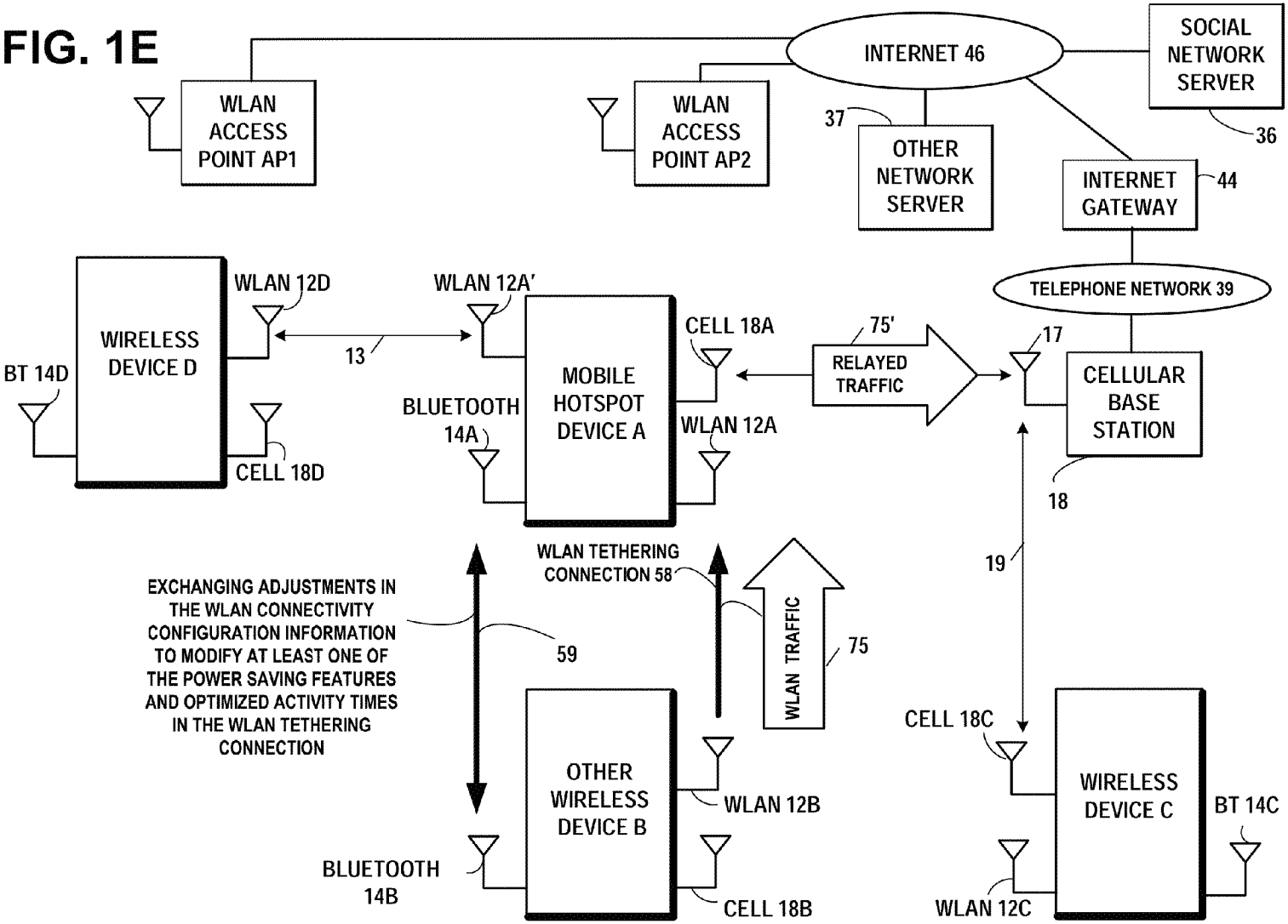
FIG. 1E is an example network diagram of the mobile wireless hotspot device A and the other wireless device B of FIG. 1D, exchanging adjustments in the WLAN connectivity configuration information to modify at least one of the power saving features and optimized activity times in the WLAN tethering connection, in accordance with example embodiments of the invention.

FIG. 1E is an example network diagram of the mobile wireless hotspot device A and the other wireless device B of FIG. 1D, exchanging messages for adjustments 59 in the WLAN connectivity configuration information to modify at least one of the power saving features and optimized activity times in the WLAN tethering connection 58, in accordance with example embodiments of the invention. WLAN traffic 75 from the wireless device B is shown being relayed by the mobile hotspot device A from its cell phone circuit 18A as the relayed traffic 75' to the antenna 17 of the cellular base station 18. The cellular base station 18 passes the traffic on to the telephone network 39, and internet gateway 44 to the Internet 46, towards a destination server 36, in accordance with example embodiments of the invention. The destination server 36 may be a social network server connected to the Internet 46.

In another example embodiment of the invention, the mobile hotspot device A and the client wireless device D may exchange over a BLUETOOTH protocol control channel between BLUETOOTH protocol circuits 14D and 14A, messages for adjustments in the WLAN connectivity configuration information to modify at least one of the power saving features and optimized activity times in the WLAN tethering connection between the WLAN circuit 12A' of the mobile wireless hotspot A and the WLAN circuit 12D of the wireless device B, in accordance with example embodiments of the invention.

Figure 1F:
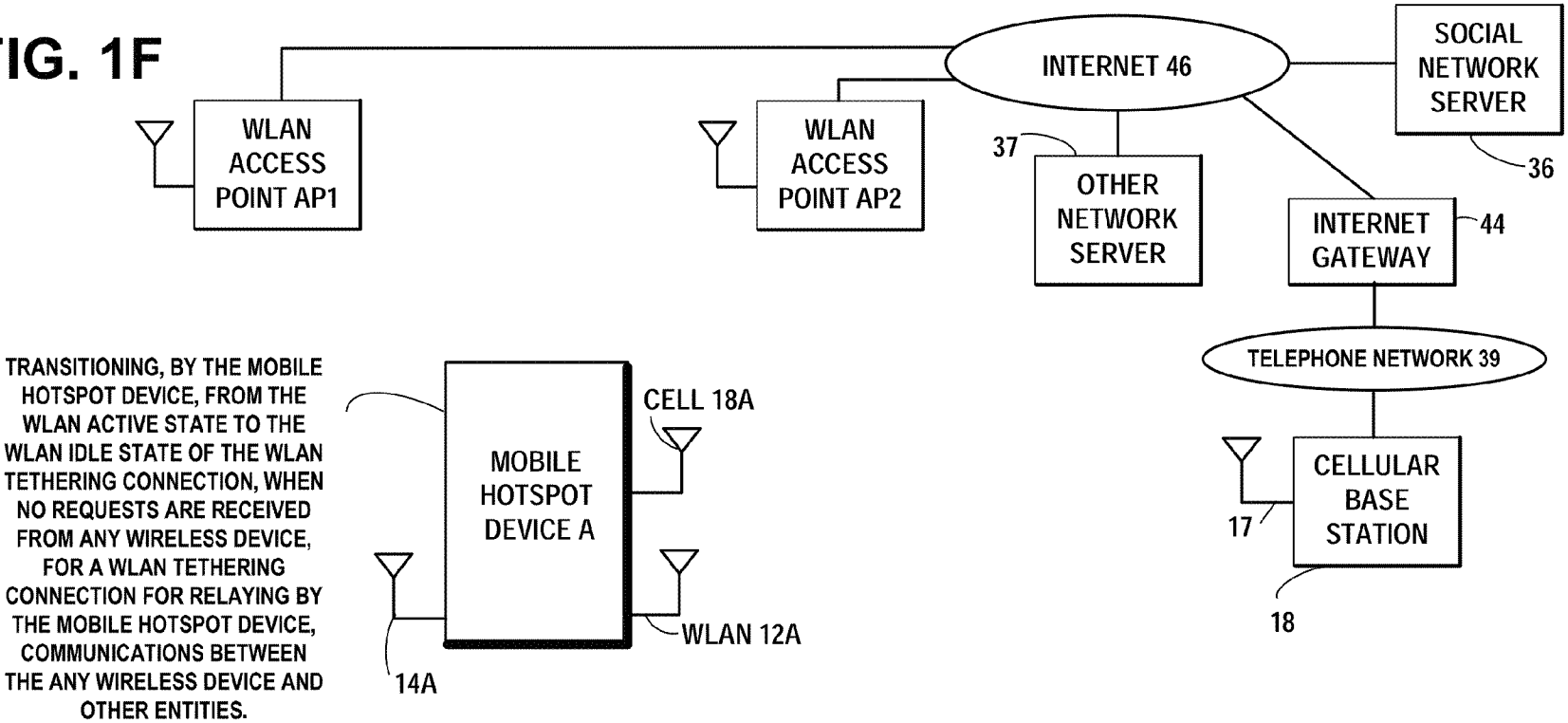
FIG. 1F is an example network diagram of the mobile wireless hotspot device A of FIG. 1E, transitioning, by the mobile hotspot device, from the WLAN active state to the WLAN idle state of the WLAN tethering connection, when no requests are received from any wireless device, for a WLAN tethering connection for relaying by the mobile hotspot device, communications between the any wireless device and a cellular telephone network, in accordance with example embodiments of the invention.

FIG. 1F is an example network diagram of the mobile wireless hotspot device A of FIG. 1E, transitioning from the WLAN active state to the WLAN idle state of the WLAN tethering connection, when no requests are received from any wireless device, for a WLAN tethering connection for relaying by the mobile hotspot device A, communications between the any wireless device and the cellular telephone network 18, in accordance with example embodiments of the invention.

Figure 1G:
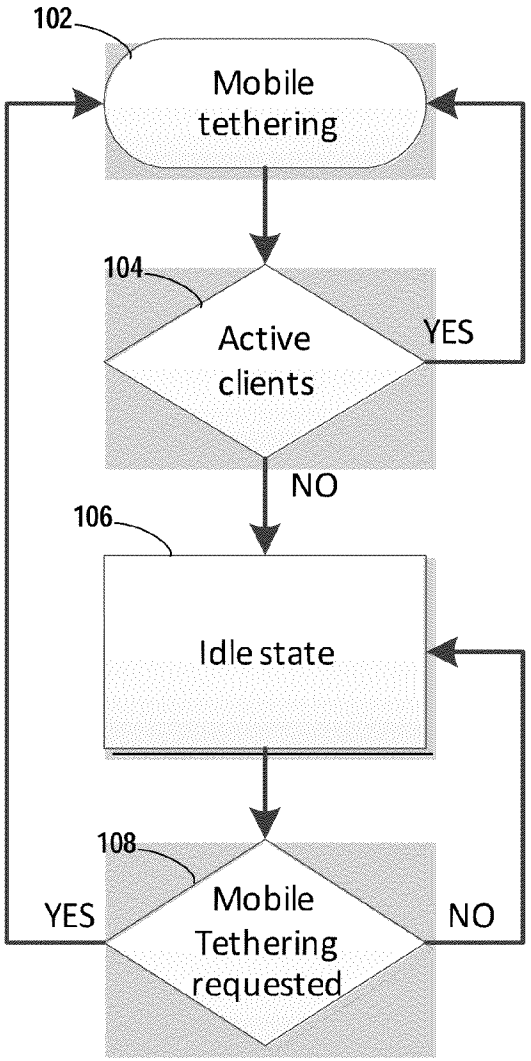
FIG. 1G is an example flow diagram of the operation of the mobile hot spot device, wherein tethering is active until there are no active clients and then it goes into the idle state and may check that its control radio is turned on and that all connected clients support the power save feature. After receiving a tethering request from a client, it turns on mobile tethering and may also inform the client that it is up and running, in accordance with example embodiments of the invention.

FIG. 1G is an example flow diagram 100 of the operation of the mobile hot spot device A, wherein tethering is active in step 102 until here are no active clients as determined in step 104. If there are no active clients, then the mobile hot spot A goes into the idle state in step 106 and may check that its BLUETOOTH protocol control radio 14A is turned on and that all connected clients support the power save feature. After receiving a tethering request from a client in step 108, the mobile hot spot A turns on mobile tethering in s102 and may also inform the client that it is up and running, in accordance with example embodiments of the invention.

Figure 2A:
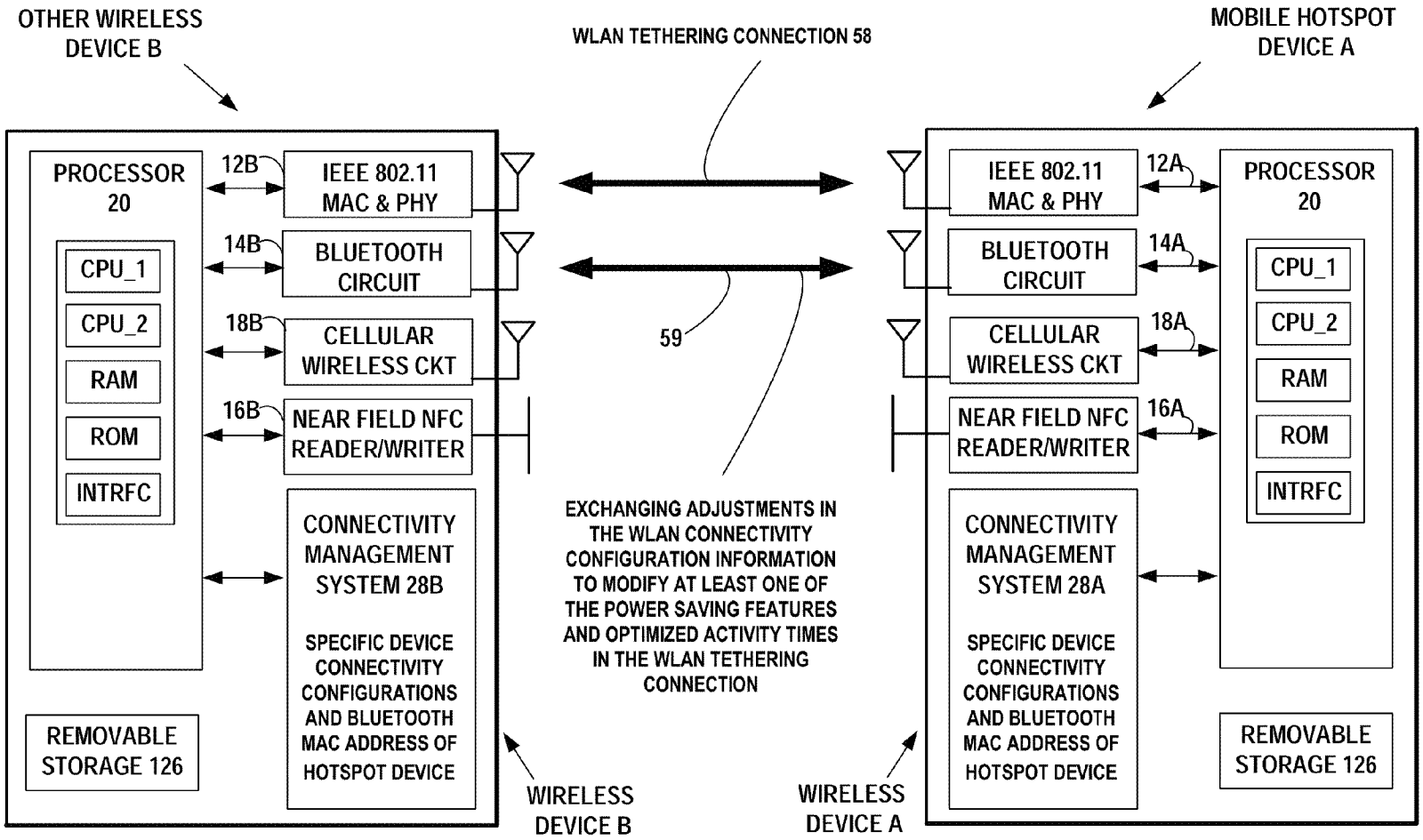
FIG. 2A is an example functional block diagram of the mobile wireless hotspot device A and the other wireless device B of FIG. 1D, exchanging adjustments in the WLAN connectivity configuration information over the BLUETOOTH protocol control channel, to modify at least one of the power saving features and optimized activity times in the WLAN tethering connection, in accordance with example embodiments of the invention.

FIG. 2A is an example functional block diagram of the mobile wireless hotspot device A and the other wireless device B of FIG. 1D, exchanging adjustments 59 in the WLAN connectivity configuration information over the BLUETOOTH protocol control channel 52, to modify at least one of the power saving features and optimized activity times in the WLAN tethering connection 58, in accordance with example embodiments of the invention.

In accordance with an embodiment of the invention, mobile hotspot device A further includes an NFC reader/writer 16A, a BLUETOOTH protocol transceiver 14A, a IEEE 802.11 WLAN transceiver 12A, and a cellular telephone transceiver 18A. The cellular telephone transceiver 18A may be based on Wide Area (WAN) communications protocols that include Global System for Mobile Communications (GSM), General Packet Radio service (GPRS), Enhanced data rates for GSM evolution (EDGE), Evolution-Data Optimized (EV-DO), and Wideband Code Division Multiple Access (W-CDMA).

Figure 2B:
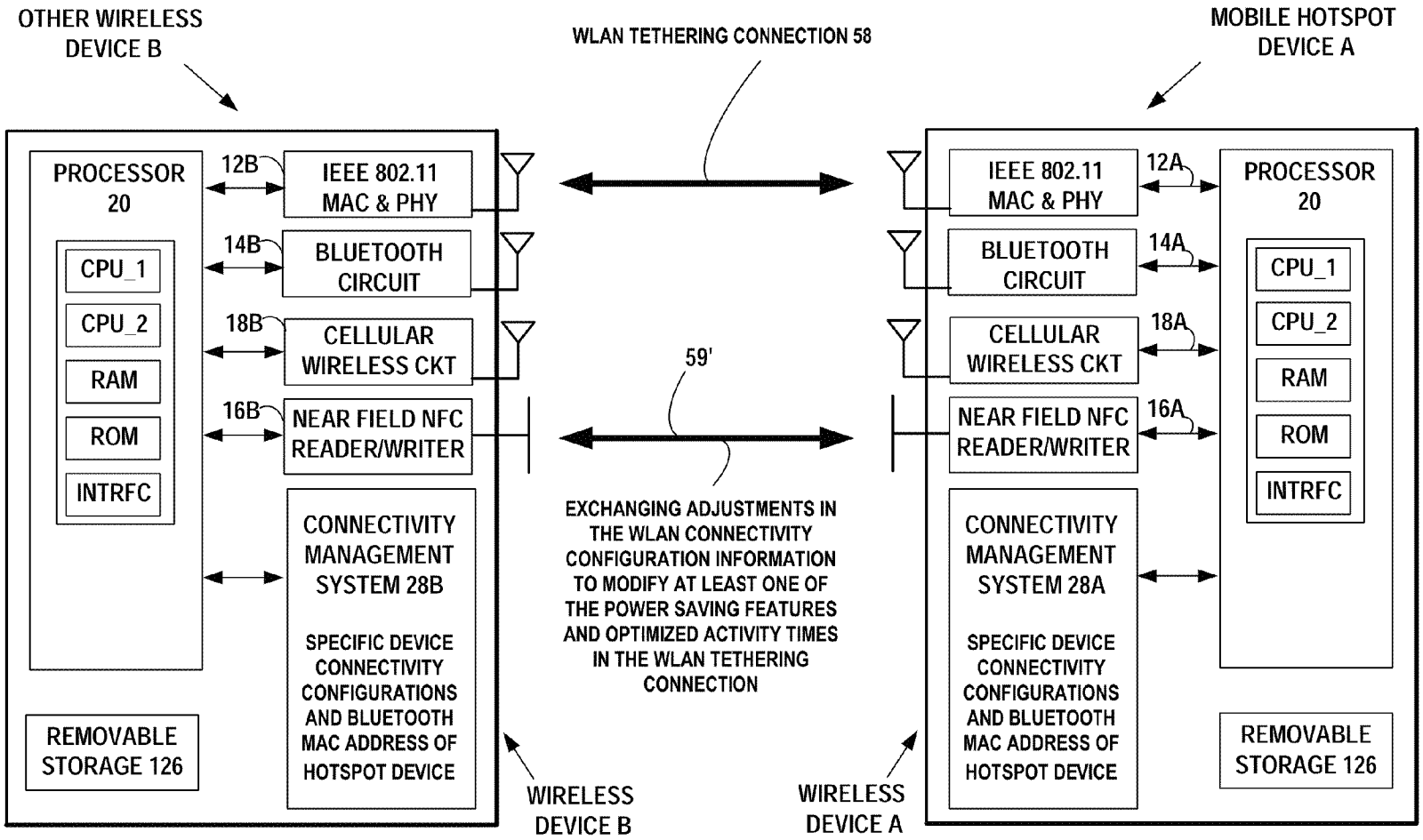
FIG. 2B is an example functional block diagram of the mobile wireless hotspot device A and the other wireless device B of FIG. 2A, exchanging adjustments in the WLAN connectivity configuration information over the Near Field Communications (NFC) control channel or another local connectivity channel having low power, to modify at least one of the power saving features and optimized activity times in the WLAN tethering connection, in accordance with example embodiments of the invention.
Figure 4:
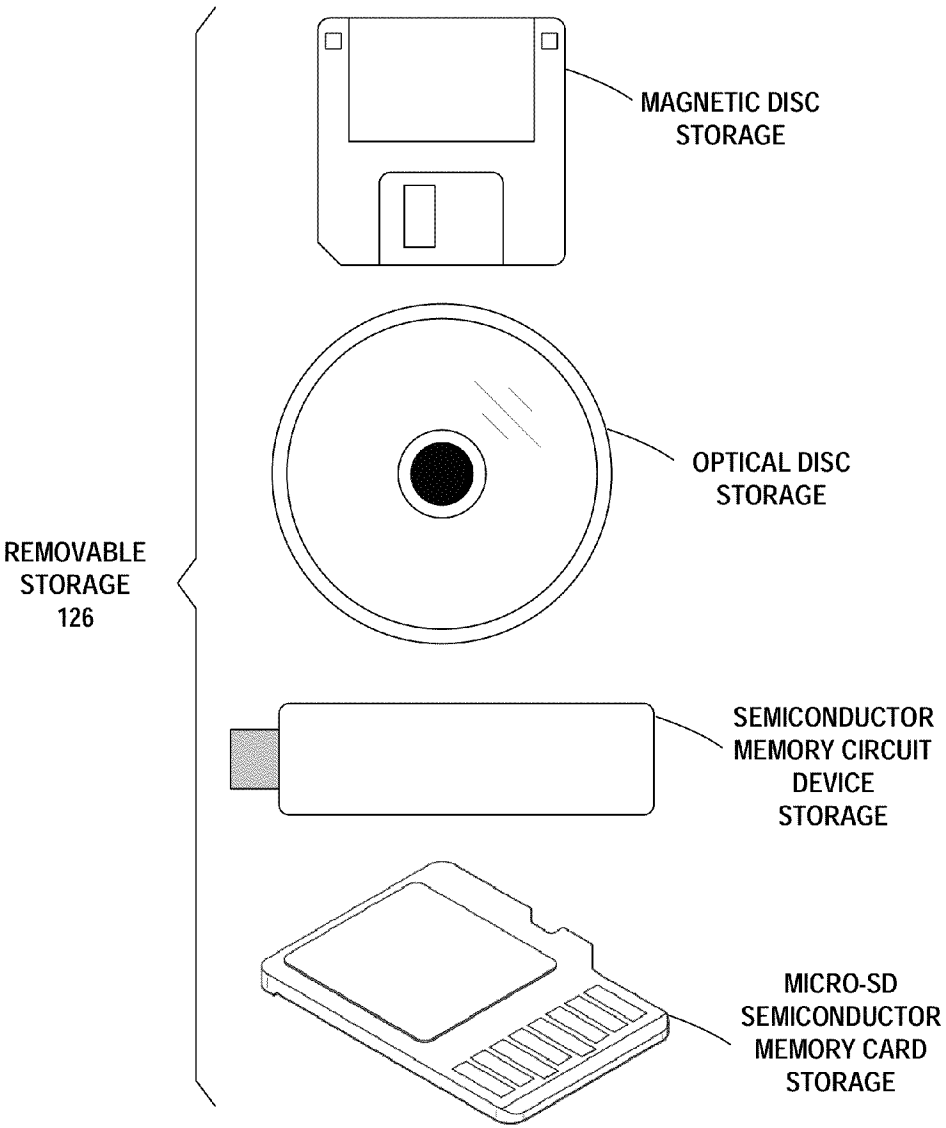
FIG. 4 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an example embodiment of the invention, the mobile hotspot device A may be a device having an overall function as a PDA, cell phone, laptop or palmtop computer, or the like. The mobile hotspot device A includes a processor 20 that includes a single core, dual core or multi-core central processing unit (CPU_1 and CPU_2), a random access memory (RAM), a read only memory (ROM), and interface circuits to interface with circuits, such as a cell phone radio, a battery and other power sources, key pad, touch screen, display, microphone, speakers, ear pieces, camera or other imaging devices, etc. in the device A. The RAM and ROM may be removable memory devices 126 such as smart cards, SIMs, WIMs, semiconductor memories such as RAM, ROM, PROMS, flash memory devices, etc., as shown in FIG. 4. The IEEE 802.11 MAC and PHY 12A, provide the medium access control and radio for IEEE 802.11 WLAN communications. The mobile hotspot device A may include a user interface such as a key pad and a location detection device such as the global positioning system (GPS). Device A may measure its location by the GPS, by cellular telephone Cell-ID sensed by the wide area wireless transceiver 18A, or by WLAN signals sensed by the IEEE 801.11 transceiver 12A, for example. With reference to FIG. 2B, the other wireless device B has similar components to mobile hotspot device A in FIG. 2A.

In an example embodiment of the invention, the mobile hotspot device A may include the connectivity management system 28A, to read device capabilities of the mobile hotspot device A. The connectivity management system 28A may generate the user specific device connectivity configurations to enable the other wireless device B, to automatically connect to the mobile hotspot device A as a tethered wireless device, the connectivity configurations including a specification of a WLAN tethering connection having a network name (SSID) and passkey.

FIG. 2B is an example functional block diagram of the mobile wireless hotspot device A and the other wireless device B of FIG. 2A, exchanging adjustments 59' in the WLAN connectivity configuration information over the Near Field Communications (NFC) control channel via the NFC reader/writer 16A and NFC reader/writer 16B, to modify at least one of the power saving features and optimized activity times in the WLAN tethering connection 58, in accordance with example embodiments of the invention. In an example embodiment of the invention, the mobile wireless hotspot device A and the other wireless device B of FIG. 2A, may exchange adjustments 59' in the WLAN connectivity configuration information over another local connectivity channel having low power.

In an example embodiment of the invention, the connectivity management system 28A in the mobile hotspot device A, may read device capabilities mobile hotspot device A. The connectivity management system 28A may generate user specific device connectivity configurations to enable a other wireless device B, to automatically connect to the mobile hotspot device A as a tethered wireless device, the connectivity configurations including specification of a WLAN tethering connection having a network name and passkey. The connectivity management system 28A may receive from the other wireless device B, a WLAN tethering connection request based on the user specific device connectivity configurations.

In an example embodiment of the invention, the other wireless device B may exchange information directly with the mobile hotspot device A via a short range communications link, such as the BLUETOOTH protocol (or BLUETOOTH Low Energy) circuits 14A and 14B or the Near Field Communications (NFC) reader/writer circuits 16A and 16B.

Figure 3A:
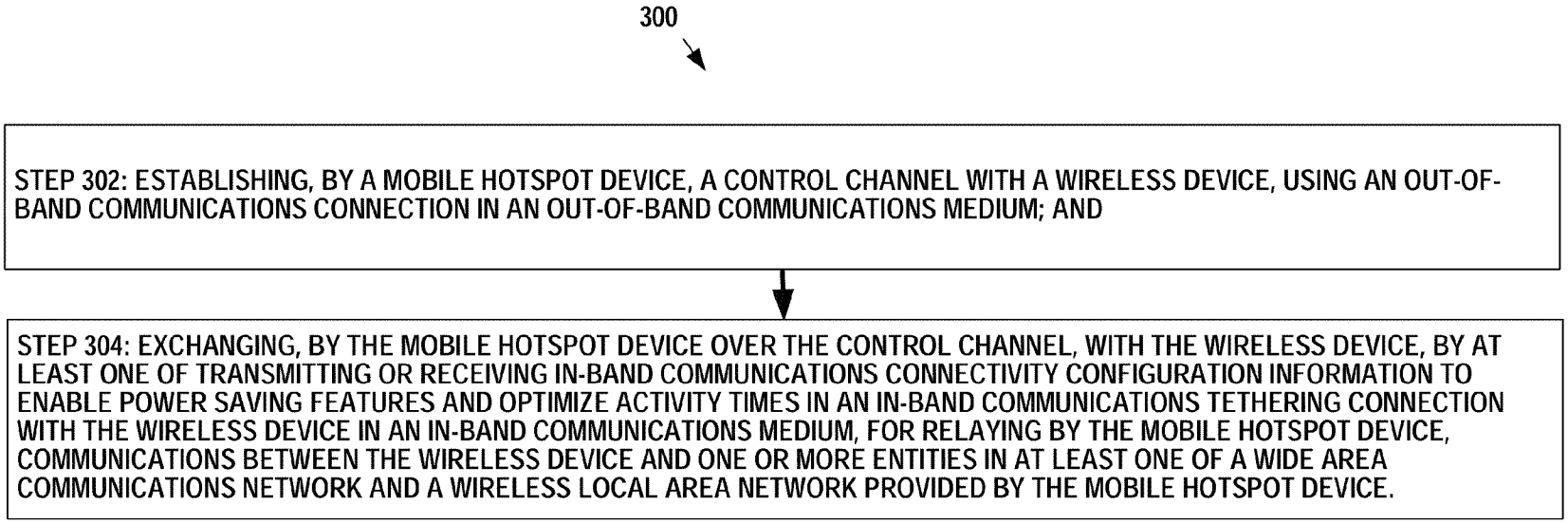
FIG. 3A is an example flow diagram of the process performed by mobile hotspot device, in accordance with example embodiments of the invention.

FIG. 3A is an example flow diagram 300 of the process performed by mobile hotspot device A, in accordance with example embodiments of the invention. The steps of the flow diagram represent computer code instructions stored in the RAM and/or ROM memory of the mobile hotspot device A, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 302: establishing, by a mobile hotspot device, a control channel with a wireless device, using an out-of-band communications connection in an out-of-band communications medium; and Step 304: exchanging, by the mobile hotspot device over the control channel, with the wireless device, by at least one of transmitting or receiving in-band communications connectivity configuration information to enable power saving features and optimize activity times in an in-band communications tethering connection with the wireless device in an in-band communications medium, for relaying by the mobile hotspot device, communications between the wireless device and one or more entities in at least one of a wide area communications network and a wireless local area network provided by the mobile hotspot device.

Figure 3B:
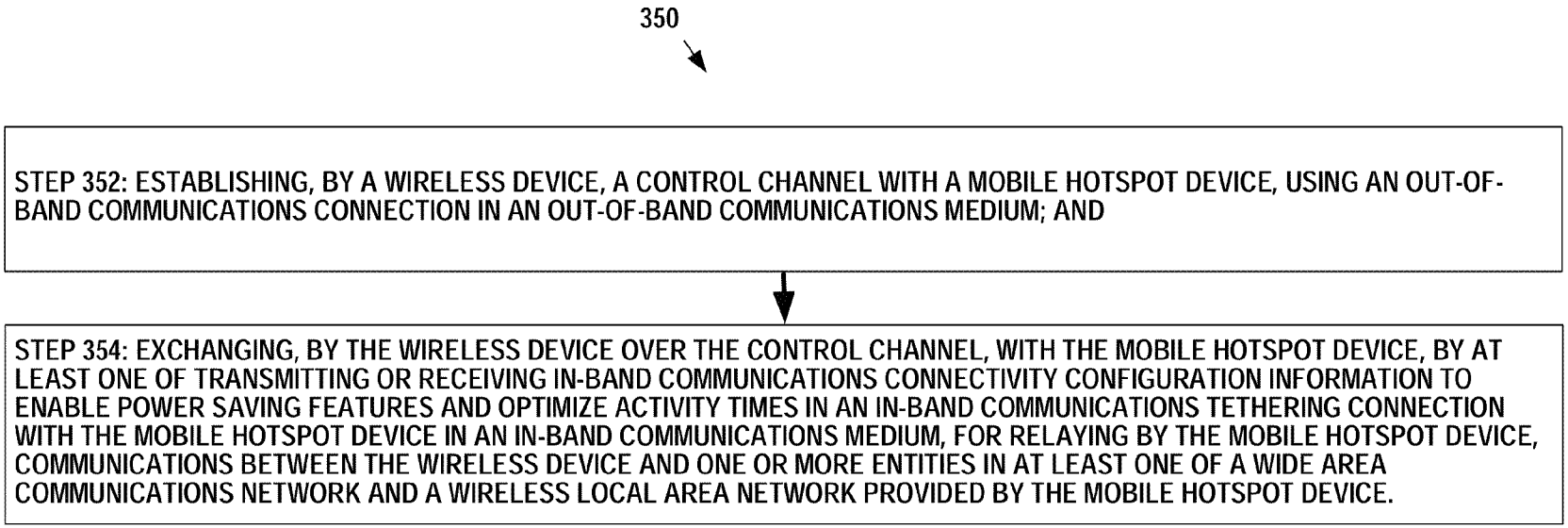
FIG. 3B is an example flow diagram of the process performed by the other wireless device, in accordance with example embodiments of the invention.

FIG. 3B is an example flow diagram 350 of the process performed by the other wireless device B, in accordance with example embodiments of the invention. The steps of the flow diagram represent computer code instructions stored in the RAM and/or ROM memory of the other wireless device B, which when executed by the central processing units (CPU), carry out the functions of the example embodiments of the invention. The steps may be carried out in another order than shown and individual steps may be combined or separated into component steps. Additional steps may be included in this sequence. The steps of the example method are as follows.

Step 352: establishing, by a wireless device, a control channel with a mobile hotspot device, using an out-of-band communications connection in an out-of-band communications medium; and Step 354: exchanging, by the wireless device over the control channel, with the mobile hotspot device, by at least one of transmitting or receiving in-band communications connectivity configuration information to enable power saving features and optimize activity times in an in-band communications tethering connection with the mobile hotspot device in an in-band communications medium, for relaying by the mobile hotspot device, communications between the wireless device and one or more entities in at least one of a wide area communications network and a wireless local area network provided by the mobile hotspot device.

FIG. 4 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

In an alternate example embodiment of the invention, RFID transponders may be used in devices A and B, which may be the passive type or the active type, instead of the NFC transponders. A passive RFID transponder requires no internal power source to communicate with an RFID reader, and is only active when it is near an RFID reader that energizes the transponder with a continuous radio frequency signal at a resonant frequency of the antenna. The small electrical current induced in the antenna by the continuous radio frequency signal provides enough power for an integrated circuit in the transponder to power up and transmit a modulated response, typically by backscattering the continuous carrier wave from the RFID reader. A passive RFID transponder may include writable electrically erasable, programmable, read-only memory (EEPROM) for storing data received from the RFID reader, which modulates the continuous carrier wave sent by the RFID reader. Reading distances for passive RFID transponders typically range from a few centimeters to a few meters, depending on the radio frequency and antenna design. By contrast, active RFID transponders require a power source to receive and transmit information with an RFID reader. The RFID transponder may be affixed to or integrated with the wireless device A and device B and the user brings the RFID transponder on the device A close to an RFID reader circuit in device B to allow near field communication between the devices. In example embodiments, both devices A and B may have RFID reader circuits to read RFID signals from the other device.

In an example embodiment, the wireless transceiver carrier in device A and device B may be a suitable short-range communications protocol, such as Radio Frequency Identification (RFID), Near Field Communication (NFC), Infrared Data Association (IrDA), or Ultra Wide Band (UWB), for example.

An example of the Radio Frequency Identification (RFID) out-of-band short-range carrier is described, for example, ISO 11785 (air interface protocol), ISO 14443 (air interface protocol), and ISO 15693, incorporated herein by reference.

An example of the Near Field Communication (NFC) out-of-band short-range carrier is described, for example, in ISO/IEC 14443 and ISO/IEC 18092, incorporated herein by reference.

An example of the Infrared Data Association (IrDA) out-of-band short-range carrier is described, for example, in IrDA Link Access Protocol, v1.1 (1996), incorporated herein by reference.

An example of the Ultra Wide Band (UWB) out-of-band short-range carrier is described, for example, in WiMedia Common Radio Platform Specification, Version 1.5 (2010), incorporated herein by reference.

In example embodiments, the wireless transceiver carrier in device A and device B may be a suitable communications protocol, such as a Vehicle Area (WVAN) communications protocol, Wireless Video Networks (WVAN-TV) communications protocol, Personal Area (WPAN) communications protocol, Local Area (WLAN) communications protocol, or Wide Area (WAN) communications protocol, using the standard procedures and primitives defined by the respective standards. Personal Area (WPAN) communications protocols include BLUETOOTH protocol BR/EDR, BLUETOOTH protocol Low Energy, Wireless USB (WUSB), Ultra Wideband (UWB), ZigBee (IEEE 802.15.4, or IEEE 802.15.4a) for short range communication between devices. Local Area (WLAN) communications protocols include IEEE 802.11, digital enhanced cordless telecommunications (DECT) and HIPERLAN. Wide Area (WAN) communications protocols include Global System for Mobile Communications (GSM), General Packet Radio service (GPRS), Enhanced data rates for GSM evolution (EDGE), Evolution-Data Optimized (EV-DO), and Wideband Code Division Multiple Access (W-CDMA).

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

The invention claimed is:

[1. A method, comprising:

establishing, by a mobile hotspot device, a control channel with a wireless device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, and shared secret information;

exchanging, by the mobile hotspot device over the control channel, with the wireless device, WLAN communications connectivity configuration information to enable power saving in a WLAN communications tethering connection with the wireless device in a WLAN communications medium, for relaying by the mobile hotspot device, communications between the wireless device and one or more entities in at least one of a wide area communications network and a wireless local area network provided by the mobile hotspot device; and exchanging, by the mobile hotspot device over the control channel, with the wireless device, at least one of scheduled sleep and awake periods wherein both the mobile hotspot device and the wireless device observe substantially same sleep and awake periods and information of the sleep and awake periods in a WLAN tethering connection.]

2. The method of claim [1] *25*, further comprising:

receiving, by the mobile hotspot device, over the control channel, a request from the wireless device for a WLAN communications tethering connection for relaying by the mobile hotspot device, communications between the wireless device and a wide area communications network;

performing, by the mobile hotspot device, said exchanging over the control channel, with the wireless device, of the WLAN communications connectivity configuration information, in response to receiving the request; and transitioning, by the mobile hotspot device, from a WLAN communications idle state to a WLAN communications active state using the power saving for the WLAN communications tethering connection, in response to receiving the request.

3. The method of claim 2, further comprising:

exchanging, by the mobile hotspot device, over the control channel, with the wireless device, adjustments in the WLAN communications connectivity configuration information to modify at least one of the power saving in the WLAN communications tethering connection with the wireless device.

4. The method of claim 2, further comprising:

transitioning, by the mobile hotspot device, from the WLAN communications active state to the WLAN communications idle state of the WLAN communications tethering connection, when no requests are received from any wireless device, for a WLAN communications tethering connection for relaying by the mobile hotspot device, communications between the any wireless device and a wide area communications network.

5. The method of claim [1] *25*, wherein the Bluetooth™ communications connection is one of a Bluetooth™, a Bluetooth™ Low Energy, or a Near Field Communications connection and the WLAN communications tethering connection is a WLAN connection or another local connectivity channel having low power.

[6. The method of claim 1, further comprising:

exchanging, by the mobile hotspot device, via at least one of the Bluetooth™ communications medium with the wireless device or via a wide area network connected to a server, at least one of a Bluetooth™ communications MAC address of the hotspot device, a Bluetooth™ communications MAC address of the wireless device, Bluetooth™ pairing information, and shared secret information, for said establishing of the control channel with the wireless device.]

[7. The method of claim 1, further comprising:

exchanging, by the mobile hotspot device over the control channel, with the wireless device, at least one of IEEE 802.11 WLAN tethering connections with an SSID and passkeys, a required authentication procedure, a public key of the mobile hotspot, available data rates, available data throughput, and a required site blacklist for virus protection, to enable power saving features and optimize activity times in a WLAN communications tethering connection with the wireless device in a WLAN communications medium.]

[8. A method, comprising:

establishing, by a mobile hotspot device, a control channel with a wireless device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, and shared secret information;

exchanging, by the mobile hotspot device over the control channel, with the wireless device, WLAN communications connectivity configuration information to enable power saving features in a WLAN communications tethering connection with the wireless device in a WLAN communications medium, for relaying by the mobile hotspot device, communications between the wireless device and one or more entities in at least one of a wide area communications network and a wireless local area network provided by the mobile hotspot device;

reading, by a connectivity management system in the mobile hotspot device, device capabilities of the mobile hotspot device;

generating, by the connectivity management system in the mobile hotspot device, the WLAN communications connectivity configuration information to enable the wireless device to connect to the mobile hotspot device as a tethered wireless device, the WLAN communications connectivity configuration information including specification of the WLAN tethering connection having a network name and passkey; and receiving, by the connectivity management system in the mobile hotspot device, via the Bluetooth™ communications medium from the wireless device, a WLAN tethering connection request based on the WLAN communications connectivity configuration information.]

[9. An apparatus, comprising:

at least one processor;

at least one memory including computer program code;

the at least one memory and the computer program code configured to, with the at least one processor, cause the apparatus at least to:

establish a control channel with a wireless device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, and shared secret information;

exchange over the control channel, with the wireless device, WLAN communications connectivity configuration information to enable power saving in a WLAN communications tethering connection with the wireless device in a WLAN communications medium, for relaying by the apparatus, communications between the wireless device and one or more entities in at least one of a wide area communications network and a wireless local area network provided by the apparatus; and exchange over the control channel, with the wireless device, at least one of scheduled sleep and awake periods wherein both the apparatus and the wireless device observe substantially same sleep and awake periods and information for timing of the sleep and awake periods in a WLAN tethering connection.]

[10. The apparatus of claim 9, further comprising:

the at least one memory and the computer program code configured to, with the at least one processor, cause the apparatus at least to:

receive over the control channel, a request from the wireless device for a WLAN communications tethering connection for relaying by the apparatus, communications between the wireless device and a wide area communications network;

perform said exchanging over the control channel, with the wireless device, of the WLAN communications connectivity configuration information, in response to receiving the request; and transition from a WLAN communications idle state to a WLAN communications active state using the power saving for the WLAN communications tethering connection, in response to receiving the request.]

[11. The apparatus of claim 10, further comprising:

the at least one memory and the computer program code configured to, with the at least one processor, cause the apparatus at least to:

exchange over the control channel, with the wireless device, adjustments in the WLAN communications connectivity configuration information to modify at least one of the power saving in the WLAN communications tethering connection with the wireless device.]

[12. The apparatus of claim 10, further comprising:

the at least one memory and the computer program code configured to, with the at least one processor, cause the apparatus at least to:

transition from the WLAN communications active state to the WLAN communications idle state of the WLAN communications tethering connection, when no requests are received from any wireless device, for a WLAN communications tethering connection for relaying by the apparatus, communications between the any wireless device and a wide area communications network.]

[13. The apparatus of claim 9, wherein the Bluetooth™ communications connection is one of a Bluetooth, a Bluetooth Low Energy, or a Near Field Communications connection and the WLAN communications tethering connection is a WLAN connection or another local connectivity channel having low power.]

[14. The apparatus of claim 9, further comprising:

the at least one memory and the computer program code configured to, with the at least one processor, cause the apparatus at least to:

exchange via at least one of the Bluetooth™ communications medium with the wireless device or via a wide area network connected to a server, at least one of a Bluetooth™ communications MAC address of the hotspot device, a Bluetooth™ communications MAC address of the wireless device, Bluetooth™ pairing information, and shared secret information, for said establishing of the control channel with the wireless device.]

[15. An apparatus, comprising:

at least one processor;

at least one memory including computer program code;

the at least one memory and the computer program code configured to, with the at least one processor, cause the apparatus at least to:

establish a control channel with a wireless device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, and shared secret information;

exchange over the control channel, with the wireless device, WLAN communications connectivity configuration information to enable power saving in a WLAN communications tethering connection with the wireless device in a WLAN communications medium, for relaying by the apparatus, communications between the wireless device and one or more entities in at least one of a wide area communications network and a wireless local area network provided by the apparatus;

read, by a connectivity management system in the apparatus, device capabilities of the apparatus;

generate, by the connectivity management system in the apparatus, the WLAN communications connectivity configuration information to enable the wireless device to connect to the apparatus as a tethered wireless device, the WLAN communications connectivity configuration information including specification of the WLAN tethering connection having a network name and passkey; and receive, by the connectivity management system in the apparatus, via the Bluetooth™ communications medium from the wireless device, a WLAN tethering connection request based on the WLAN communications connectivity configuration information.]

[16. A computer program product comprising computer executable program code recorded on a non-transitory computer readable non-transitory storage medium, the computer executable program code comprising:

code for establishing, by a mobile hotspot device, a control channel with a wireless device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, and shared secret information;

code for exchanging, by the mobile hotspot device over the control channel, with the wireless device, WLAN communications connectivity configuration information to enable power saving in a WLAN communications tethering connection with the wireless device in a WLAN communications medium, for relaying by the mobile hotspot device, communications between the wireless device and one or more entities in at least one of a wide area communications network and a wireless local area network provided by the mobile hotspot device; and code for exchanging, by the mobile hotspot device over the control channel, with the wireless device, at least one of scheduled sleep and awake periods wherein both the mobile hotspot device and the wireless device observe substantially same sleep and awake periods and information for the sleep and awake periods in a WLAN tethering connection.]

[17. A method, comprising:

establishing, by a wireless device, a control channel with a mobile hotspot device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, and shared secret information;

exchanging, by the wireless device over the control channel, with the mobile hotspot device, WLAN communications connectivity configuration information to enable power saving in a WLAN communications tethering connection with the mobile hotspot device in a WLAN communications medium, for relaying by the mobile hotspot device, communications between the wireless device and one or more entities in at least one of a wide area communications network and a wireless local area network provided by the mobile hotspot device; and exchanging, by the wireless device over the control channel, with the mobile hotspot device, at least one of scheduled sleep and awake periods wherein both the mobile hotspot device and the wireless device observe substantially same sleep and awake periods and information for the sleep and awake periods in a WLAN tethering connection.]

[18. The method of claim 17, further comprising:

transmitting, by the wireless device, over the control channel, a request to the mobile hotspot device for a WLAN communications tethering connection for relaying by the mobile hotspot device, communications between the wireless device and a wide area communications network;

performing, by the wireless device, said exchanging over the control channel, with the mobile hotspot device, of the WLAN communications connectivity configuration information; and establishing, by the wireless device, the WLAN communications tethering connection with the mobile hotspot device, using the power saving for the WLAN communications tethering connection.]

[19. An apparatus, comprising:

at least one processor;

at least one memory including computer program code;

the at least one memory and the computer program code configured to, with the at least one processor, cause the apparatus at least to:

establish a control channel with a mobile hotspot device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, and shared secret information;

exchange over the control channel, with the mobile hotspot device, WLAN communications connectivity configuration information to enable power saving in a WLAN communications tethering connection with the mobile hotspot device in a WLAN communications medium, for relaying by the mobile hotspot device, communications between the apparatus and one or more entities in at least one of a wide area communications network and a wireless local area network provided by the mobile hotspot device; and exchange over the control channel, with the mobile hotspot device, at least one of scheduled sleep and awake periods wherein both the mobile hotspot device and the apparatus observe substantially same sleep and awake periods and information for the sleep and awake periods in a WLAN tethering connection.]

[20. The apparatus of claim 19, further comprising:

the at least one memory and the computer program code configured to, with the at least one processor, cause the apparatus at least to:

transmit over the control channel, a request to the mobile hotspot device for a WLAN communications tethering connection for relaying by the mobile hotspot device, communications between the apparatus and a wide area communications network;

perform said exchanging over the control channel, with the mobile hotspot device, of the WLAN communications connectivity configuration information; and establish the WLAN communications tethering connection with the mobile hotspot device, using the power saving for the WLAN communications tethering connection.]

[21. A computer program product comprising computer executable program code recorded on a non-transitory computer readable non-transitory storage medium, the computer executable program code comprising:

code for establishing, by a wireless device, a control channel with a mobile hotspot device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, and shared secret information;

code for exchanging, by the wireless device over the control channel, with the mobile hotspot device, WLAN communications connectivity configuration information to enable power saving in a WLAN communications tethering connection with the mobile hotspot device in a WLAN communications medium, for relaying by the mobile hotspot device, communications between the wireless device and one or more entities in at least one of a wide area communications network and a wireless local area network provided by the mobile hotspot device; and code for exchanging, by the wireless device over the control channel, with the mobile hotspot device, at least one of scheduled sleep and awake periods wherein both the mobile hotspot device and the wireless device observe substantially same sleep and awake periods and information for the sleep and awake periods in a WLAN tethering connection.]

*22. A method for controlling power saving of tethering connections, comprising:*

*establishing, by a mobile hotspot device, a control channel with a wireless device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, or shared secret information;*

*exchanging, by the mobile hotspot device over the established control channel, with the wireless device, wireless local area network (WLAN) connectivity configuration information prior to establishing the WLAN tethering connection with the wireless device, the WLAN connectivity configuration information comprising at least one of a network name (SSID) or a passkey for enabling the wireless device to join a wireless local area network (WLAN) provided by the mobile hotspot device as a tethered device, and at least information regarding scheduled sleep and awake periods wherein both the mobile hotspot device and the wireless device observe substantially same sleep and awake periods in a WLAN tethering connection between the mobile hotspot device and the wireless device;*

*establishing, by the mobile hotspot device, the WLAN tethering connection with the wireless device, using the at least one of the network name (SSID) or the passkey based on the WLAN connectivity configuration information exchanged over the control channel; and*

*controlling, by the mobile hotspot device, the WLAN tethering connection between the mobile hotspot device and the wireless device based on the WLAN connectivity configuration information exchanged information over the control channel regarding the scheduled sleep and awake periods to save power in the WLAN tethering connection when relaying communications between the wireless device and one or more entities in at least one of a wide area communications network or a wireless local area network provided by the mobile hotspot device.*

*23. The method of claim 22, further comprising:*

*exchanging, by the mobile hotspot device over the control channel with the wireless device, at least one of IEEE 802.11 WLAN tethering connections with an SSID and passkeys, a required authentication procedure, a public key of the mobile hotspot, available data rates available data throughput, or a required site blacklist for virus protection, to enable power saving in a WLAN communications tethering connection with the wireless device in a WLAN communications medium.*

*24. The method of claim 22, further comprising:*

*controlling WLAN sleep scheduling of the wireless device, while minimizing energy consumption in the mobile hotspot device during its performing a control operation, by establishing the Bluetooth control channel to exchange information regarding the scheduled sleep and awake periods in the WLAN tethering connection between the mobile hotspot device and the wireless device.*

*25. The method of claim 22, further comprising: exchanging, by the mobile hotspot device, over the control channel with the wireless device, adjustments in the WLAN communications connectivity configuration information to modify at least one of the power saving in the WLAN communications tethering connection with the wireless device.*

*26. An apparatus for controlling power saving of tethering connections, comprising:*

*at least one processor;*

*at least one memory including computer program code;*

*the at least one memory and the computer program code configured to, with the at least one processor, cause the apparatus at least to:*

*establish a control channel with a wireless device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the apparatus, a Bluetooth™ communications MAC address of the wireless device, Bluetooth™ pairing information, or shared secret information;*

*exchange over the established control channel, with the wireless device, wireless local area network (WLAN) connectivity configuration information prior to establishing the WLAN tethering connection with the wireless device, the WLAN connectivity configuration information comprising at least one of a network name (SSID) or a passkey for enabling the wireless device to join a wireless local area network (WLAN) provided by the apparatus as a tethered device, and at least information regarding scheduled sleep and awake periods wherein both the apparatus and the wireless device observe substantially same sleep and awake periods in a WLAN tethering connection between the apparatus and the wireless device;*

*establish the WLAN tethering connection with the wireless device, using the at least one of the network name (SSID) or the passkey based on the WLAN connectivity configuration information exchanged over the control channel; and*

*control the WLAN tethering connection between the apparatus and the wireless device based on the WLAN connectivity configuration information exchanged over the control channel regarding the scheduled sleep and awake periods to save power in the WLAN tethering connection when relaying communications between the wireless device and one or more entities in at least one of a wide area communications network or a wireless local area network provided by the apparatus.*

*27. The apparatus of claim 26, further comprising:*

*the at least one memory and the computer program code configured to, with the at least one processor, cause the apparatus at least to:*

*receive over the control channel a request from the wireless device for a WLAN communications tethering connection for relaying by the apparatus communications between the wireless device and a wide area communications network;*

*perform said exchanging over the control channel with the wireless device, of the WLAN communications connectivity configuration information, in response to receiving the request; and*

*transition from a WLAN communications idle state to a WLAN communications active state using the power saving for the WLAN communications tethering connection, in response to receiving the request.*

*28. The apparatus of claim 27, further comprising:*

*the at last one memory and the computer program code configured to, with the at least one processor, cause the apparatus at least to:*

*exchange over the control channel, with the wireless device, adjustments in the WLAN communications connectivity configuration information to modify at least one of the power saving in the WLAN communications tethering connection with the wireless device.*

*29. The apparatus of claim 27, further comprising:*

*the at last one memory and the computer program code configured to, with the at least one processor, cause the apparatus at least to:*

*transition from the WLAN communications active state to the WLAN communications idle state of the WLAN communications tethering connection, when no requests are received from any wireless device, for a WLAN communications tethering connection for relaying by the apparatus, communications between the any wireless device and a wide area communications network.*

*30. The apparatus of claim 26, wherein the Bluetooth™ communications connection is one of a Bluetooth, a Bluetooth Low Energy, or a Near Field Communications connection and the WLAN communications tethering connection is a WLAN connection or another local connectivity channel having low power.*

*31. A computer program product comprising computer executable program code recorded on a non-transitory computer readable non-transitory storage medium for controlling power saving of tethering connections, the computer executable program code comprising:*

*code for establishing, by a mobile hotspot device, a control channel with a wireless device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, or shared secret information;*

*code for exchanging, by the mobile hotspot device over the established control channel with the wireless device, wireless local area network (WLAN) connectivity configuration information prior to establishing the WLAN tethering connection with the wireless device, the WLAN connectivity configuration information comprising at least one of a network name (SSID) or a passkey for enabling the wireless device to join a wireless local area network (WLAN) provided by the mobile hotspot device as a tethered device, and at least information regarding scheduled sleep and awake periods wherein both the mobile hotspot device and the wireless device observe substantially same sleep and awake periods in a WLAN tethering connection between the mobile hotspot device and the wireless device;*

*establishing, by the mobile wireless device, the WLAN tethering connection with the wireless device, using the at least one of the network name (SSID) or the passkey based on the WLAN connectivity configuration information exchanged over the control channel; and*

*code for controlling, by the mobile hotspot device, the WLAN tethering connection between the mobile hotpot device and the wireless device based on the WLAN connectivity configuration information exchanged over the control channel regarding the scheduled sleep and awake periods to save power in the WLAN tethering connection when relaying communications between the wireless device and one or more entities in at least one*

*of a wide area communications network or a wireless local area network provided by the mobile hotspot device.*

*32. A method for controlling power saving of tethering connections, comprising:*

*establishing, by a wireless device, a control channel with a mobile hotspot device, using a Bluetooth™ communications connection in a Bluetooth™ communications medium, wherein said establishing of the control channel with the mobile hotspot comprises exchanging, via at least one of the Bluetooth™ communications medium or via a wide area network connected to a server, at least one of a Bluetooth™ communications MAC address of the mobile hotspot device*

*a Bluetooth™ communications MAC address of the wireless device Bluetooth™ pairing information, or shared secret information;*

*exchanging, by the wireless device over the established control channel, with the mobile hotspot device, wireless local area network (WLAN) connectivity configuration information prior to establishing the WLAN tethering connection with the mobile hotspot device, the WLAN connectivity configuration information comprising at least one of a network name (SSID) or a passkey for enabling the wireless device to join a wireless local area network (WLAN) provided by the mobile hotspot device as a tethered device, and at least information regarding scheduled sleep and awake periods wherein both the mobile hotspot device and the wireless device observe substantially same sleep and awake periods in a WLAN tethering connection between the mobile hotspot device and the wireless device;*

*establishing, by the wireless device, the WLAN tethering connection with the mobile hotspot device, using the at least one of a network name (SSID) or the passkey based on the WLAN connectivity configuration information exchanged over the control channel; and*

*controlling, by the wireless device, the WLAN tethering connection between the mobile hotspot device and the wireless device based on the WLAN connectivity configuration information exchanged over the control channel regarding the scheduled sleep and awake periods to save power in the WLAN tethering connection when relaying communications between the wireless device and one or more entities in at least one of a wide area communications network or a wireless local area network provided by the mobile hotspot device.*

*33. The method of claim 32, further comprising:*

*transmitting, by the wireless device, over the control channel, a request to the mobile hotpot device for a WLAN communications tethering connection for relaying by the mobile hotspot device, communications between the wireless device and a wide area communications network;*

*performing, by the wireless device, said exchanging over the control channel, with the mobile hotspot device, of the WLAN communications connectivity configuration information; and*

*establishing, by the wireless device, the WLAN communications tethering connection with the mobile hotspot device, using the power saving for the WLAN communications tethering connection.*

*34. The method of claim 32, further comprising:*

*controlling WLAN sleep scheduling of the mobile hotspot device, while minimizing energy consumption in the wireless device during its performing a control operation, by establishing the Bluetooth control channel to exchange information regarding the scheduled sleep and awake periods in the WLAN tethering connection between the mobile hotspot device and the wireless device.*

*35. The method of claim 32, further comprising: exchanging, by the wireless device, over the control channel, with the mobile hotspot device, adjustments in the WLAN communications connectivity configuration information to modify at least one of the power saving in the WLAN communications tethering connection with the mobile hotspot device.*

*36. An apparatus for controlling power saving of tethering connections, comprising:*

*at least one processor;*

*at least one memory including computer program code;*

*the at least one memory and the computer program code configured to, with the at least one processor, cause the apparatus at least to:*

*establish a control channel with a mobile hotspot device, using a Bluetooth™ communications connection in a Bluetooth™ communications medium, wherein said establishing of the control channel with the mobile hotspot device comprises exchanging, via at least one of the Bluetooth™ communications medium or via a wide area network connected to a server, at least one of a Bluetooth™ communications MAC address of the mobile hotspot device,*

*a Bluetooth™ communications MAC address of the wireless device, Bluetooth™ pairing information, or shared secret information;*

*exchange over the established control channel, with the mobile hotspot device, wireless local area network (WLAN) connectivity configuration information prior to establishing the WLAN tethering connection with the mobile hotspot device, the WLAN connectivity configuration information comprising at least one of a network name (SSID) or a passkey for enabling the wireless device to join a wireless local area network (WLAN) provided by the mobile hotspot device as a tethered device, and at least information regarding scheduled sleep and awake periods wherein both the mobile hotspot device and the apparatus observe substantially same sleep and awake periods in a WLAN tethering connection between the mobile hotspot device and the wireless device;*

*establish the WLAN tethering connection with the mobile hotspot device, using the at least one of the network name (SSID) or the passkey based on the WLAN connectivity configuration information exchanged over the control channel; and*

*control the WLAN tethering connection between the apparatus and the mobile hotspot device based on the WLAN connectivity configuration information exchanged over the control channel regarding the scheduled sleep and awake periods to save power in the WLAN tethering connection when relaying communications between the wireless device and one or more entities in at least one of a wide area communications network or a wireless local area network provided by the mobile hotspot device.*

*37. The apparatus of claim 36, further comprising:*

*the at least one memory and the computer program code configured to, with the at least one processor, cause the apparatus at least to:*

*transmit over the control channel a request to the mobile hotspot device for a WLAN communications tethering*

*connection for relaying by the mobile hotspot device, communications between the apparatus and a wide area communications network;*

*perform said exchanging over the control channel with the mobile hotspot device, of the WLAN communications connectivity configuration information; and*

*establish the WLAN communications tethering connection with the mobile hotspot device, using the power saving for the WLAN communications tethering connection.*

*38. A computer program product comprising computer executable program code recorded on a non-transitory computer readable non-transitory storage medium for controlling power saving of tethering connections, the computer executable program code comprising:*

*code for establishing, by a wireless device, a control channel with a mobile hotspot device, using a Bluetooth™ communications connection in a Bluetooth™ communications medium, wherein said establishing of the control channel with the mobile hotpot device comprises*

*exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, or shared secret information;*

*code for exchanging, by the wireless device over the established control channel with the mobile hotspot device, wireless local area network (WLAN) connectivity configuration information prior to establishing the WLAN tethering connection with the mobile hotspot device, the WLAN connectivity configuration information comprising at least one of a network name (SSID) or a passkey for enabling the wireless device to join a wireless local area network (WLAN) provided by the mobile hotspot device as a tethered device, and at least information regarding scheduled sleep and awake periods wherein both the mobile hotspot device and the wireless device observe substantially same sleep and awake periods in a WLAN tethering connection between the mobile hotspot device and the wireless device;*

*code for establishing, by the wireless device, the WLAN tethering connection with the mobile hotspot device, using the at least one of the network name (SSID) or the passkey based on the WLAN connectivity configuration information exchanged over the control channel; and*

*code for controlling, by the wireless device, the WLAN tethering connection between the mobile hotspot device and the wireless device based on the WLAN connectivity configuration information exchanged over the control channel regarding the scheduled sleep and awake periods to save power in the WLAN tethering connection when relaying communications between the wireless device and one or more entities in at least one of a wide area communications network or a wireless local area network provided by the mobile hotspot device.*

*39. A method for controlling power saving of tethering connections, comprising:*

*establishing, by a mobile hotspot device, a control channel with a wireless device, using a Bluetooth™ communications connection in a Bluetooth™ communications medium, wherein said establishing of the control channel with the wireless device comprises exchanging, via at least one of the Bluetooth™ communications medium or via a wide area network connected to a server, at least one of a Bluetooth™ communications MAC address of the mobile hotspot device, a Bluetooth™ communications MAC address of the wireless device, Bluetooth™ pairing information, or shared secret information;*

*exchanging, by the mobile hotspot device over the established control channel, with the wireless device, wireless local area network (WLAN) connectivity configuration information prior to establishing the WLAN tethering connection with the wireless device, the WLAN connectivity configuration information comprising at least one of a network name (SSID) or a passkey for enabling the wireless device to join a wireless local area network (WLAN) provided by the mobile hotspot device as a tethered device, and at least information regarding scheduled sleep and awake periods wherein both the mobile hotspot device and the wireless device observe substantially same sleep and awake periods in a WLAN tethering connection between the mobile hotspot device and the wireless device;*

*establishing, by the mobile hotspot device, the WLAN tethering connection with the wireless device, using the at least one of the network name (SSID) or the passkey based on the WLAN connectivity configuration information exchanged over the control channel;*

*controlling, by the mobile hotspot device, the WLAN tethering connection between the mobile hotspot device and the wireless device based on the WLAN connectivity configuration information to the exchanged information over the control channel regarding the scheduled sleep and awake periods to save power in the WLAN tethering connection when relaying communications between the wireless device and one or more entities in at least one of a wide area communications network or a wireless local area network provided by the mobile hotspot device; and*

*exchanging, by the mobile hotspot device, over the control channel, with the wireless device, adjustments in the WLAN communications connectivity configuration information to modify at least one of the power saving in the WLAN communications tethering connection with the wireless device.*

* * * * *